United States Patent [19]
Fukasawa

[11] Patent Number: 6,021,444
[45] Date of Patent: Feb. 1, 2000

[54] INFORMATION PROCESSING SYSTEM

[75] Inventor: Toshihiko Fukasawa, Machida, Japan

[73] Assignee: Canon Kabushiki Kaisha, Tokyo, Japan

[21] Appl. No.: 08/564,661

[22] Filed: Nov. 29, 1995

[30] Foreign Application Priority Data

Nov. 30, 1994 [JP] Japan ................................. 6-296994
Nov. 30, 1994 [JP] Japan ................................. 6-296995

[51] Int. Cl.[7] ............................................. G06F 9/44
[52] U.S. Cl. ................................................... 709/300
[58] Field of Search ........................... 395/680; 709/300

[56] References Cited

FOREIGN PATENT DOCUMENTS

| | | | |
|---|---|---|---|
| 0319232 | 6/1988 | European Pat. Off. | G06F 15/40 |
| 0550369 | 7/1992 | European Pat. Off. | G06F 9/44 |
| 0623876 | 11/1994 | European Pat. Off. | G06F 9/46 |
| 2272312 | 5/1994 | United Kingdom | G06F 15/16 |

OTHER PUBLICATIONS

Ioannidis et al., "Incomplete Path Expressions and their Disambiguation", ACM, pp. 138–149, 1994.

*Primary Examiner*—Alvin E. Oberley
*Assistant Examiner*—St. John Courtenay, III
*Attorney, Agent, or Firm*—Fitzpatrick, Cella, Harper & Scinto

[57] ABSTRACT

In an information processing system which operates applications by linking them in one computer or between a plurality of computers, information by which applications of each computer of the system are allocated to a predetermined hierarchical structure is stored. In specifying an application, a path to the application in this predetermined hierarchical structure is used as identification information of the application. This provides a flexible inter-application cooperative system capable of meeting a complicated environment in which the components can dynamically change, in a system constituted by one or a plurality of computers.

42 Claims, 29 Drawing Sheets

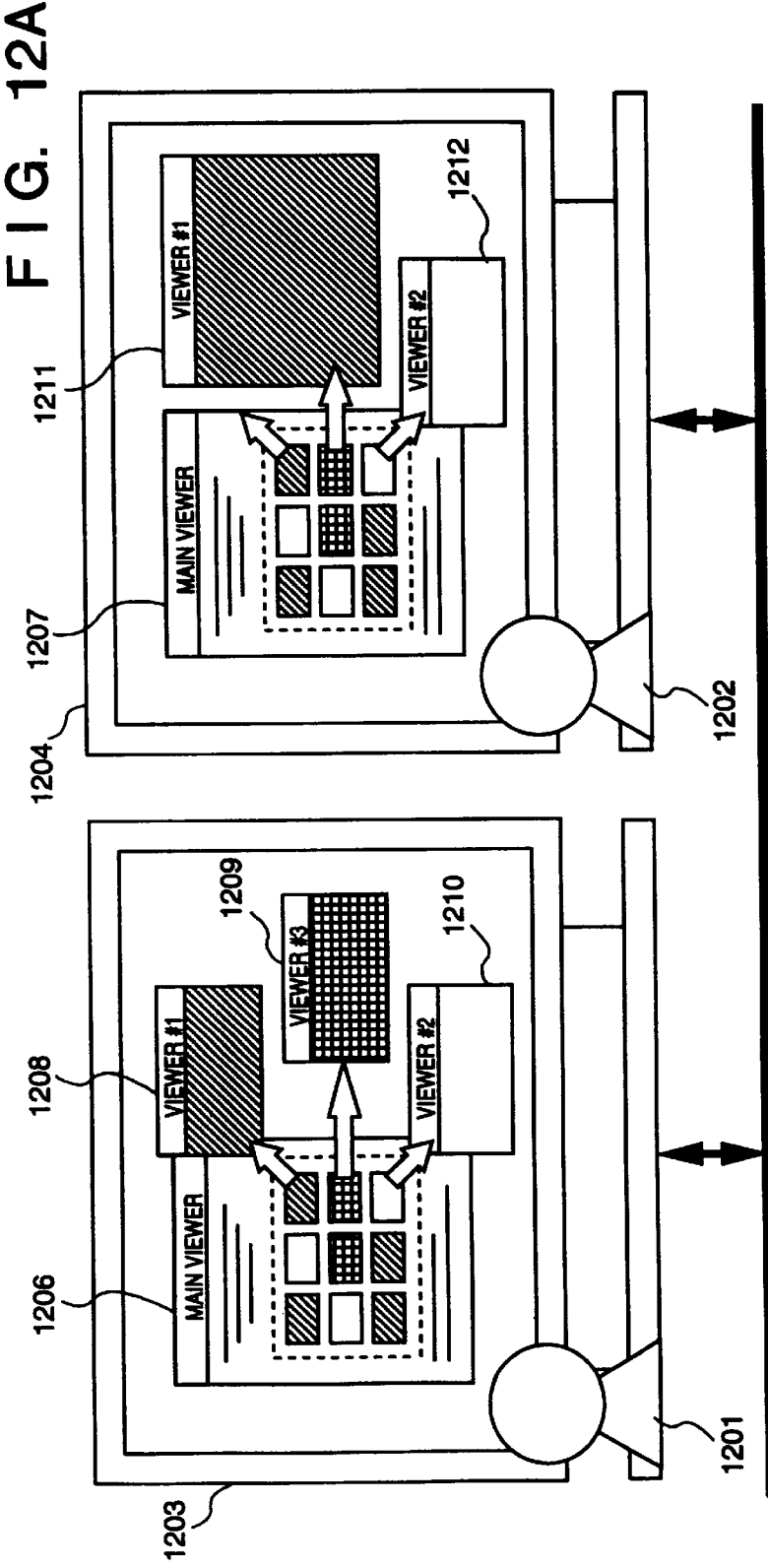

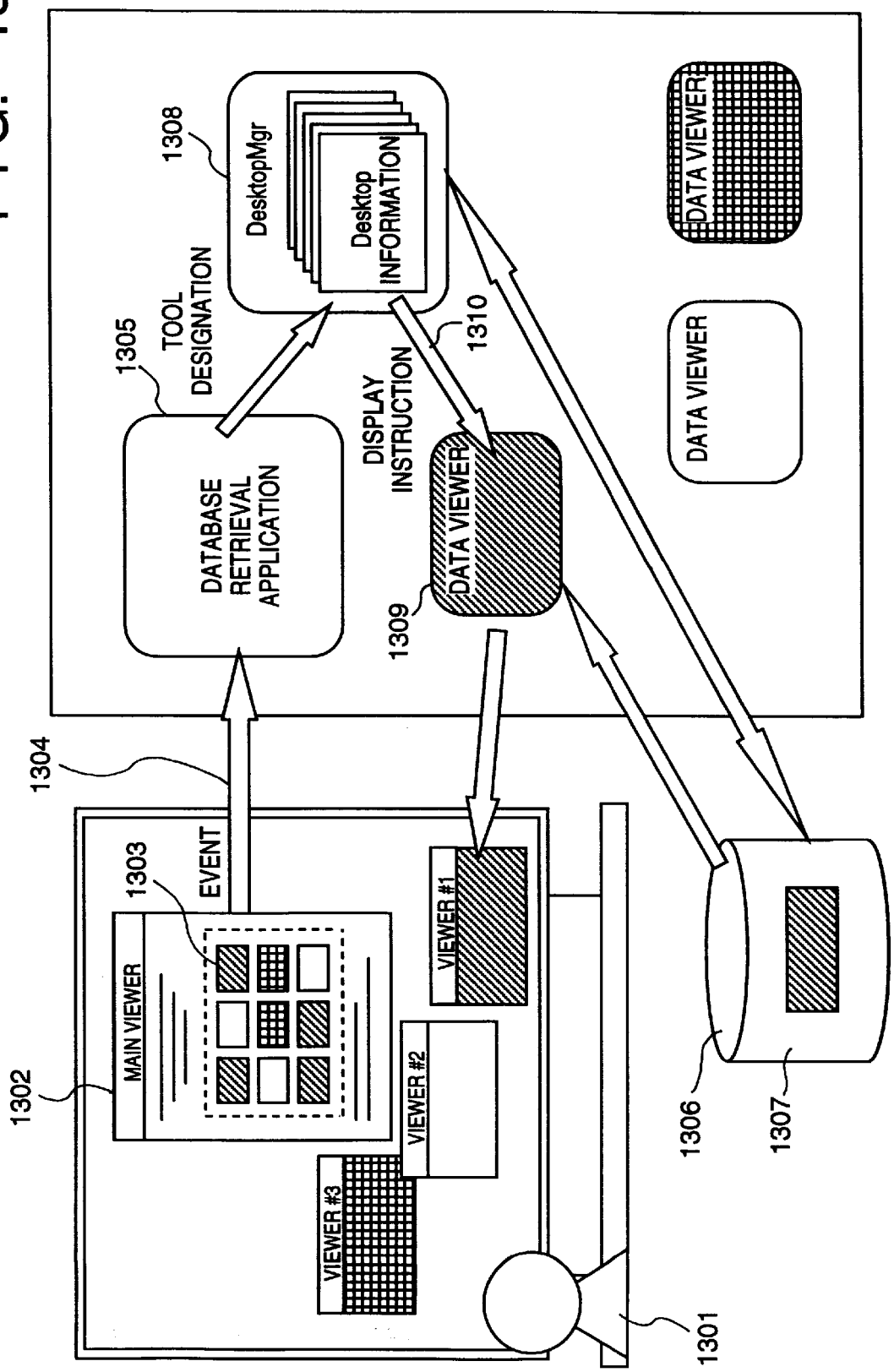

INFORMATION PROCESSING SYSTEM

BACKGROUND OF THE INVENTION

The present invention relates to a mechanism for controlling an application program which operates on one or more computers and, more particularly, to an information processing method, apparatus, and system capable of operating a plurality of applications by linking them on one or a plurality of computers. The present invention also relates to a mechanism capable of linking a plurality of applications by controlling activation, termination, and message transmission of the application programs.

Recently, a GUI (Graphical User Interface) using a window system is becoming very popular on personal computers and workstations. Accordingly, applications provided to the users are now required to provide more complicated and various functions in more sophisticated forms than the applications in program environments before the advent of GUIs.

In order to meet this demand, it has been extensively attempted to meet various circumstances by allowing a combination of a plurality of relatively simple applications by providing an inter-application cooperating mechanism, rather than by repeating extension of a single application. As the basic mechanism for this inter-application cooperative action, the use of a data exchange mechanism using inter-process communication is common.

As representative examples of the data exchange mechanism, Socket™ provided by Unix Operating Systems™ and Port™ provided by Mach Operating Systems™ are used as the basic mechanisms. Also, some systems add appropriate programs to these basic mechanisms and thereby provide interfaces more readily usable by application developers. Representative examples of these systems are Sun RPC™ of Sun Operating Systems™ and ToolTalk™ of Solaris Operating System™.

In parallel with the above phenomenon which may be said to be an improvement in the user environment, a groupware system which supports a cooperative work among the users is attracting attention.

This groupware system is computer software aiming at supporting a group work done by a plurality of users and recently lays particularly much weight on support for group works done via networks. Common groupware systems provide a television conference function using video images or a joint writing editor and thereby allow group works or conferences with remote places via networks. One possible approach to realize this groupware is to extend the user environment described above to an environment which is used in the form which involves a plurality of computers. For this purpose it is necessary to extend the basic mechanism for cooperative actions between applications so that the mechanism meets cooperative actions required in the groupware.

The following limitations must be eliminated or relaxed in order to extend the inter-application communication mechanism to the inter-user cooperative work environment. That is, a user environment which is the work environment of each individual user is constituted and characterized by applications operating in that environment. Accordingly, the inter-user cooperative work environment is realized by cooperation among user environments and hence cooperation among applications constituting these user environments. In order for a certain application to effectuate a cooperative action with applications in other user environments, this application must have information indicating what applications constitute other user environments and what role each individual application has.

Assume, for example, that an application a which operates in a user environment A communicates with an application b which operates in a user environment B. In this case the application a needs to have information indicating that the other party of communication is the application b.

In a groupware environment, however, it is possible that the application b happens to be the other party of communication only at this point of time and so the application b operates in a user environment B' at another point of time. It is also possible that at still another point of time the application a must communicate with an application c which operates in a user environment C.

A general approach by which the other party of communication is managed is to give a unique name to a process which operates in a user or group environment. Unfortunately, application developers have responsibility of avoiding duplication of names, so it is becoming difficult to meet the environment in which the constitution of applications or users frequently changes dynamically as described above.

To meet the demand for providing the inter-application cooperating mechanism, the following two methods are proposed and being examined:

(1) A method in which one application program (called a master application) which functions as the key to an application linkage exists and this master application controls other applications (called slave applications).

(2) A method in which all applications equally communicate with each other and take part in processing.

In this specification the method (1) will be referred to as a master system and the method (2) will be referred to as a communication system.

The characteristic features of the two respective methods are as follows:

Master system . . . Mechanisms of linking and integrating applications are centralized on the master. Although this facilitates formation of a slave, the program of the master is complicated accordingly. Also, the loads tend to be centralized on the master.

Communication system . . . Each application has mechanisms of linkage and integration. This complicates each individual application, but it is readily possible to distribute the loads. Also, a trouble of one application does not have a large effect on the whole system.

Generally, in the master system complicated application control can be centralized on the master, whereas in the communication system high-level processing is difficult to achieve unless a protocol between applications is defined. For this reason, the master system is used in many instances except when specific programs perform only simple data exchange.

It is unfortunate that to add a new application to applications operating in association with each other in the master system or to introduce a new linkage protocol to the method, the program (master program) of the master application needs to be modified, and even a total modification is required in some cases.

Even if a modification of the master is a small-scale one, in the environment in which the constitution of related applications changes dynamically, a modification of the master program cannot meet each individual change. This demand is becoming urgent more and more with the spread of a work environment involving a plurality of computers which results from the progress of LANs or WANS. A demand has therefore arisen for realization of a flexible application linkage control mechanism capable of meeting a complicated application linkage in which the constitution of applications can dynamically change.

SUMMARY OF THE INVENTION

The present invention has been made in consideration of the above problems and has as its object to provide an information processing method, apparatus, and system capable of providing a flexible inter-application cooperative system which can meet a complicated environment in which the components can dynamically change, in a system constituted by one or a plurality of computers.

It is another object of the present invention to provide an information processing method, apparatus, and system capable of managing applications with a high abstraction level in a complicated environment in which the components can dynamically change, in a system constituted by one or a plurality of computers.

It is still another object of the present invention to provide an information processing method, apparatus, and system capable of constructing applications operable in a complicated environment in which the components can dynamically change, without particularly taking account of the environment, in a system constituted by one or a plurality of computers.

It is still another object of the present invention to provide an information processing method, apparatus, and system capable of providing a flexible master application which can meet a complicated environment in which the components can dynamically change.

It is still another object of the present invention to provide an information processing method, apparatus, and system capable of readily constructing an application operable in a complicated environment in which the components can dynamically change, without particularly taking account of the environment.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 12 is a view showing how two users access to a database;

FIG. 13 is a view for explaining data referring processing in the second embodiment;

DETAILED DESCRIPTION OF THE PREFERRED EMBODIMENTS

Preferred embodiments of the present invention will now be described in detail in accordance with the accompanying drawings.

<First Embodiment>

Figure 1:
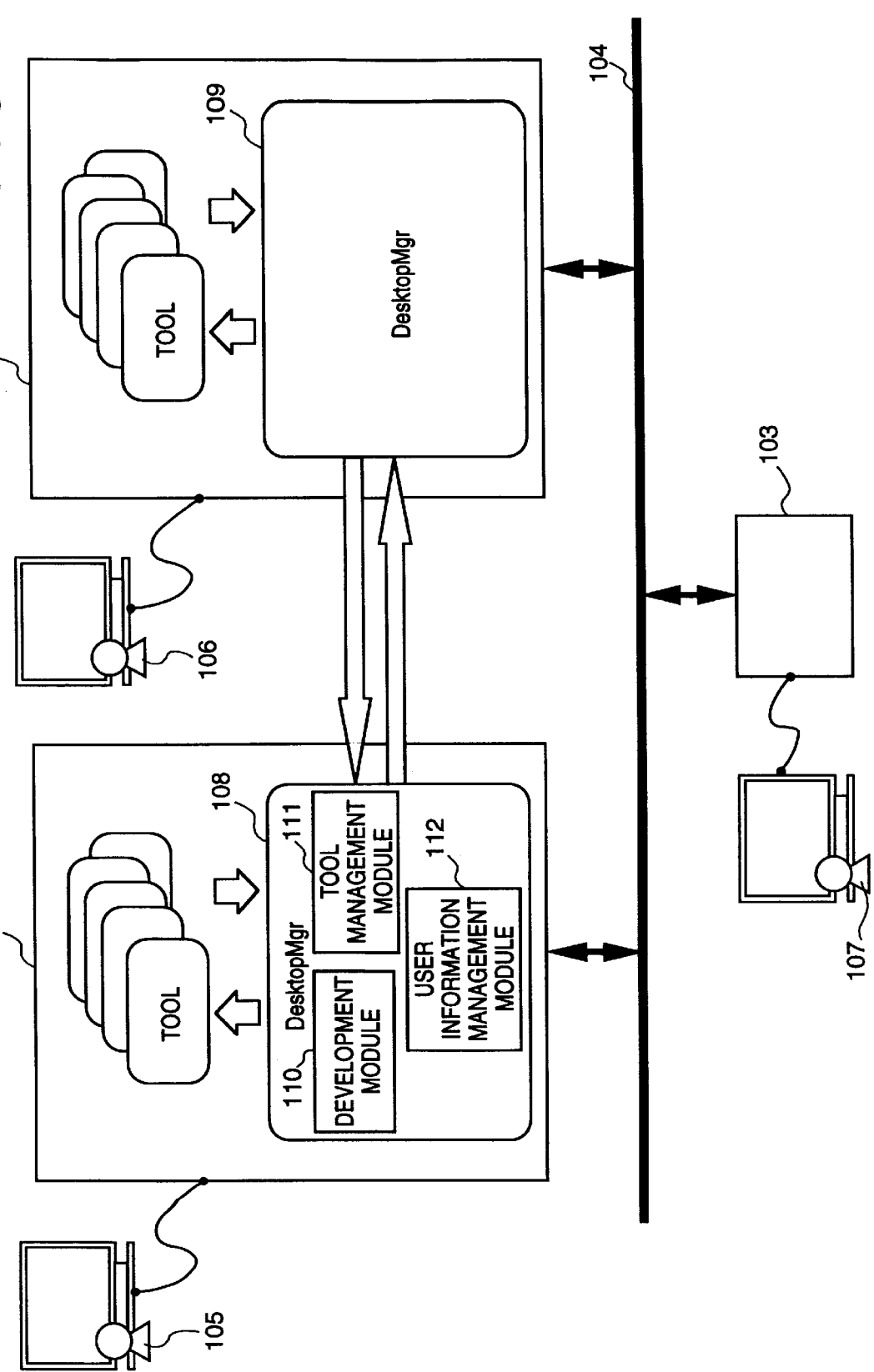
FIG. 1 is a view for explaining the outline of a cooperative groupware system according to the first embodiment.

FIG. 1 is a view for explaining the outline of a cooperative groupware system according to the first embodiment. This groupware system provides a group work environment by allowing a plurality of users to use a plurality of applications in the individual user environments and to exchange various data between these users and between the applications.

Referring to FIG. 1, personal computers 101, 102, and 103 are connected by an Ethernet cable 104 to thereby form a single LAN. In practice, several computers are further connected. The first embodiment is also applicable to a computer network centered around a WAN. Furthermore, the first embodiment can be applied to a LAN using an FDDI faster than the Ethernet cable.

In FIG. 1, the personal computers (to be referred to as PCs hereinafter) 101, 102, and 103 are used by users 105, 106, and 107, respectively. It is not determined which user uses which PC; e.g., the user 105 may use the PC 102. The user 105 may also simultaneously use the PCs 101 and 102.

In these PCs, basic software DesktopMgr's 108 and 109 for managing this groupware system and providing service and applications (to be referred to as tool processes or tools hereinafter) which use this service are operating. The DesktopMgr's 108 and 109 are basic software provided in a one-to-one correspondence with the users. The DesktopMgr's 108 and 109 manage the user environments including supports for control of start, stop, and communication of tools operating in these user environments and also manage information exchange between the users or in the whole network.

Each DesktopMgr consists of three types of modules, a development module 110, a tool management module 111, and a user information management module 112.

The development module 110 develops a tool designation done by the user into the form which the DesktopMgr can interpret. As has been conventionally performed in the development of a normal expression, this development is accomplished by replacing a character string indicative of a certain special expression with, e.g., the name of an actual tool.

The tool management module 111 manages information pertaining to tools, e.g., information indicating whether a tool operating in the user environment is in operation. This module manages the tool information by using a hash table which uses the name of a tool as the key. Also, the tool management module 111 activates a tool on the basis of the tool information. This activation of a tool is done by using the mechanism of an operating system on which this system is operating.

The user information management module 112 manages user information. That is, the user information management module 112 manages the user information by using a hash table which uses the name of a user as the key. A communication port of the DesktopMgr in each user environment also is included in the user information and used to communicate with the DesktopMgr which manages the other user environment.

Tools operating in each user environment can perform a cooperative action together with tools in the other user environment by using the service provided by the DesktopMgr's 108 and 109.

Figure 2:
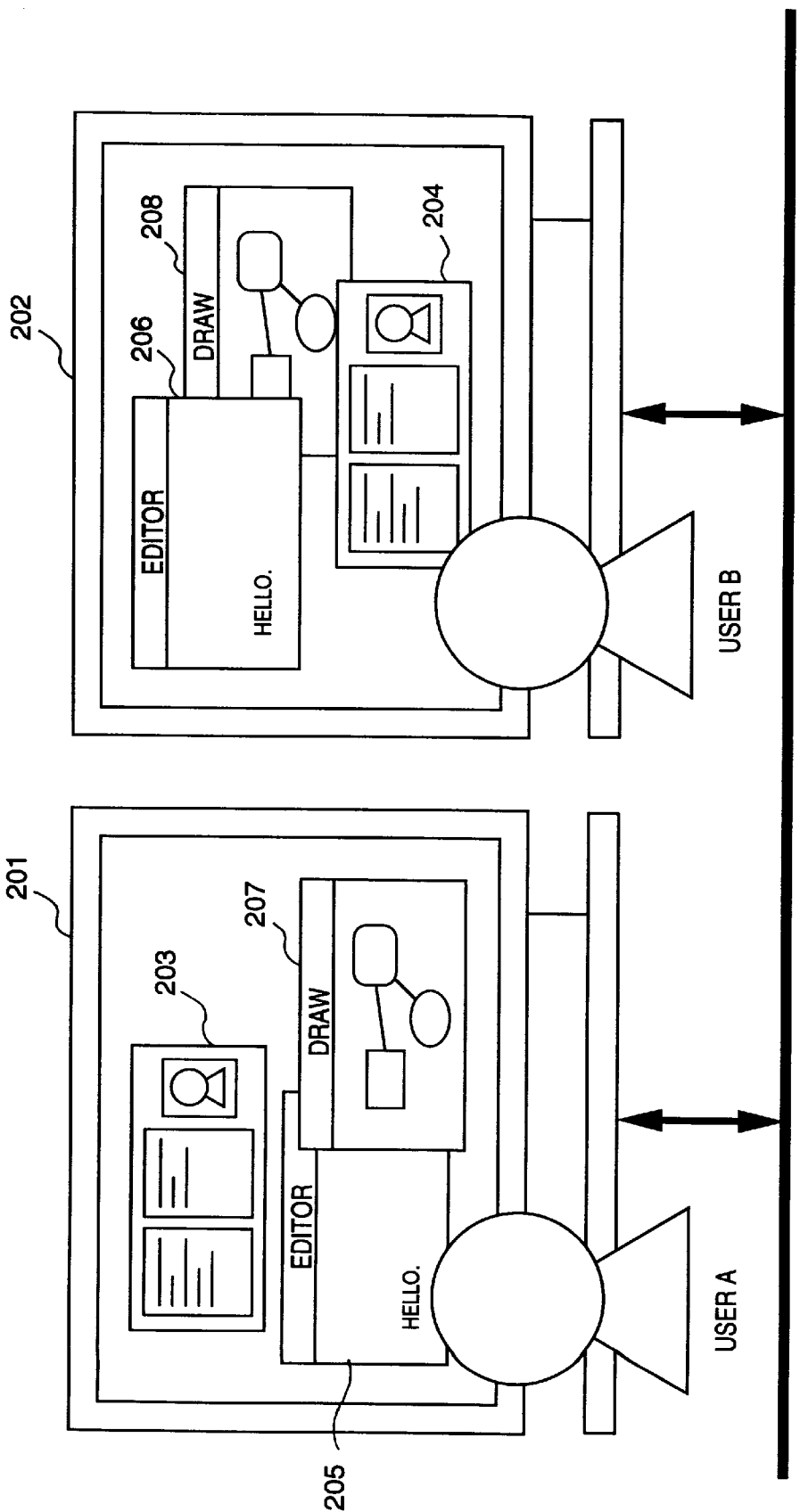
FIG. 2 is a view showing one example of the form of use of the groupware system.

FIG. 2 is a view showing one example of the form of use of the groupware system with the above arrangement. Referring to FIG. 2, two users are performing a joint work on two PCs, and the interfaces of several tools are displayed on displays 201 and 202.

In FIG. 2, database access tools 203 and 204, text editor tools 205 and 206, and draw tools 207 and 208 are used in the respective user environments. These tool pairs formed between the two users display the same information to the users. As an example, the text editor tools 205 and 206 display the same document. However, the text editor tools 205 and 206 are not necessarily identical tools, and the methods of display may be different even though the same document is displayed. In this groupware system, it is possible to use any tools suitable to the tastes of users so long as the tools can equally process the same information.

A method of managing users and tools in the group work environment as shown in FIG. 2 will be described below with reference to FIG. 3.

Figure 3:
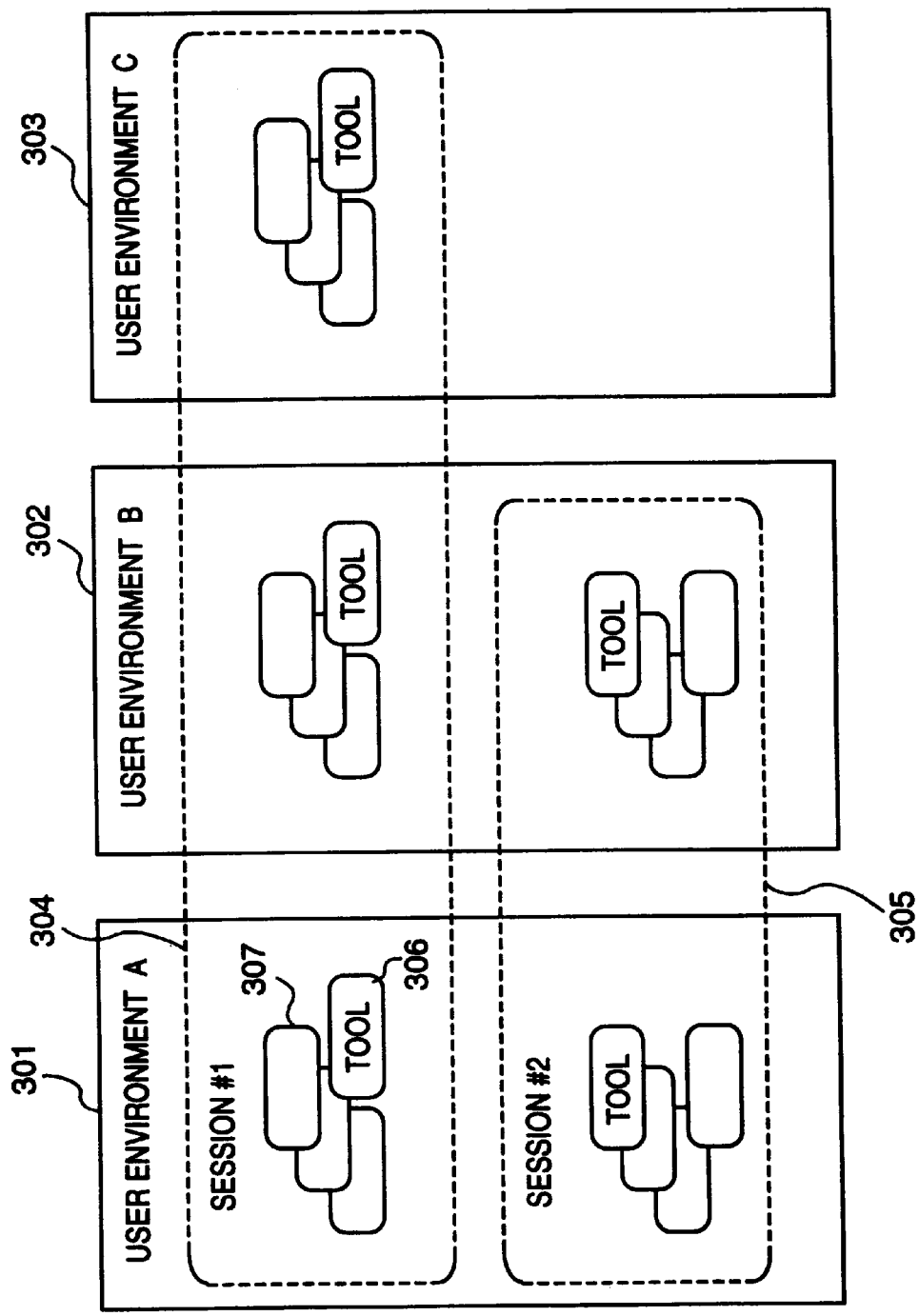
FIG. 3 is a view for explaining one example of a management method for users and tools in the group work environment as shown in FIG. 2.

In FIG. 3, assume that three users A, B, and C are performing works in user environments 301, 302, and 303, respectively. Assume also that the users A, B, and C are performing a joint work 304 and at the same time the users A and B are performing a joint work 305. The joint works 304 and 305 can also be regarded as group environments across the user environments.

In this embodiment, this joint work (or group environment) is called a session, and so the two joint works shown in FIG. 3 will be referred to as sessions 304 and 305 hereinafter. As is apparent from FIG. 3, a single user can participate in a plurality of sessions at the same time (the users A and B).

In an actual work in each session, tools designated by the session are used. In FIG. 3, tools 306 and 307 are used in the user environment 301 by the session 304.

Figure 4:
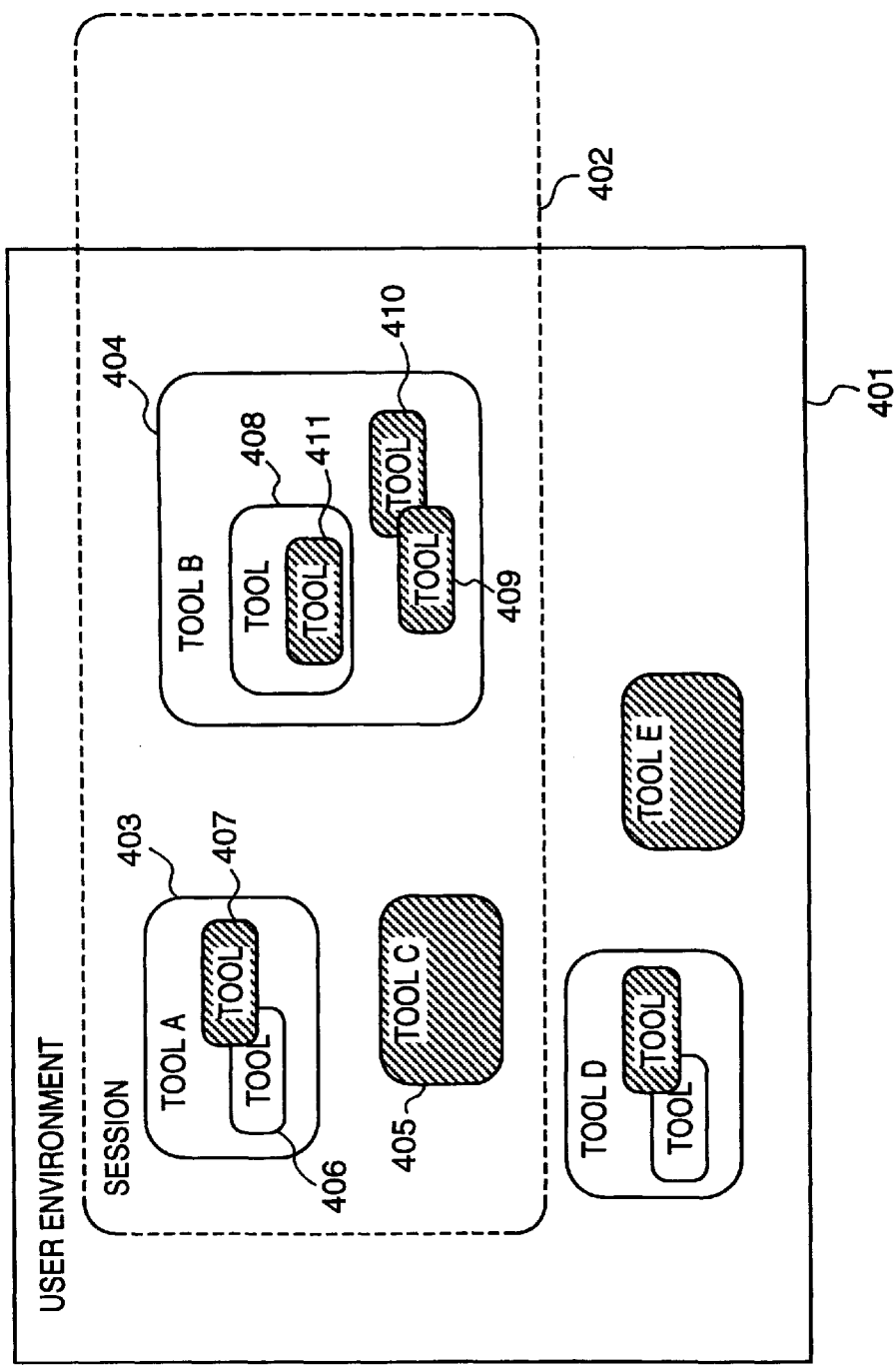
FIG. 4 is a view showing the user environment of a user participating in a certain session.

FIG. 4 shows the user environment of a user taking part in a certain session. In FIG. 4, a user environment 401 belongs to a session 402. In this session 402, three tools 403, 404, and 405 are used in a joint work. Each of the tools 403 and 404 consists of a group of several small tools (called subtools). Each subtool itself also has the ability to function as an independent tool. Referring to FIG. 4, the tool 403 consists of two subtools, i.e., tools 406 and 407. Also, the tool 404 consists of three subtools, tools 408, 409, and 410. Furthermore, the tool 408 which itself is a subtool includes a subtool 411.

In this embodiment, a tool which is formed as a group of a plurality of subtools is called an integrated tool. Also, a tool (other than an integrated tool) which cannot be divided into subtools is called an element tool. In the following description, the term "tool" is used when integrated and element tools are collectively indicated or it is not particularly necessary to distinguish between them. Note that in an actual system, an integrated tool is merely a virtual tool for the sake of management, and its function is realized by cooperation of element tools.

In FIG. 4, the tools 407, 411, 409, 410, and 405 are element tools, and the tools 403, 404, 406, and 408 are integrated tools. Arranging the relationships between the sessions, the users, and the tools in the user environment illustrated in FIG. 4 results in a hierarchical structure shown in FIG. 5.

Figure 5:
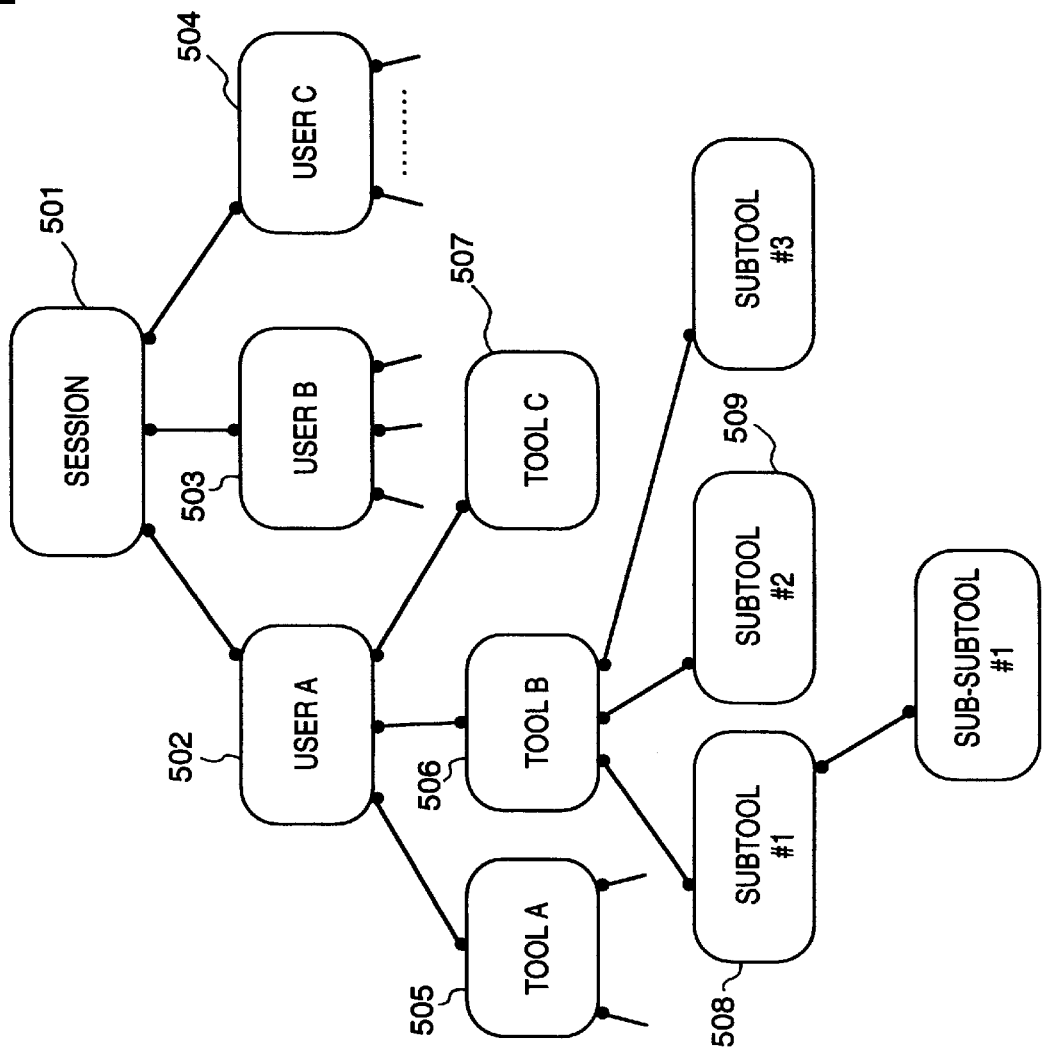
FIG. 5 is a view showing the relationship of sessions/users/tools in the user environment shown in FIG. 4.

FIG. 5 shows the relationship of sessions/users/tools in the user environment in FIG. 4.

Referring to FIG. 5, a session 501 serves as the root of this hierarchical structure. Users 502, 503, and 504 participating in the session 501 are present below the session 501, and tools such as denoted by reference numerals 505, 506, and 507 are present below each user. Of these tools, subtools such as tools 508 and 509 are added to an integrated tool such as the tool 506. The hierarchical structure thus continues as far as the final element tool. The first embodiment does not describe the case in which sessions are nested. However, the items herein mentioned are also applicable to a system which allows nested sessions.

The relationship between FIGS. 4 and 5 is as follows. The session 501 corresponds to the session 402 in FIG. 4. The user A 502 corresponds to the user environment 401. The tool A 505, the tool B 506, and the tool C 507 correspond to the tool A 403, the tool B 404, and the tool C 406, respectively.

In this embodiment, a name space is formed on the basis of this hierarchical structure to allow designation of each tools under the session management. That is, the path of names along which the hierarchical structure in FIG. 5 is traced from the session is called a tool path, and this tool path is used as a means for designating each tool.

In this embodiment, a tool path is a character string formed by connecting the names of individual hierarchical levels, i.e., the session name, the user name, and the tool name as follows:

&session name&user name&tool name&subtool name . . . . As an example, a tool path representing the tool 509 in FIG. 5 is &session&user A&tool B&subtool #2

The names of these individual hierarchical levels, such as the session name, the user name, and the tool name, as the components of the tool path, are called node names. A node name must be unique in each hierarchical level in order to use the tool path as an identifier of a tool.

In the tool path, a plurality of node names also can be designated by enumerating the names by delimiting them with ",". For example, "&session&user A&tool B&subtool #2" and "&session&user B&tool B&subtool #2" can be collectively represented by &session&[user A, user B]&tool B&subtool #2

Furthermore, it is possible to use several types of special expressions in the designation of a node name. Special expressions make an abstractive designation of a node name feasible. These special expressions will be described below.

In the hierarchical level of session names,

%current
%all
%none
%ignore can be designated. The details of the individual special expressions are as follows.

%current . . . When "%current" is designated, the name of a session to which a tool performing this designation belongs currently is interpreted as the designated session name.

%all . . . When "%all" is designated, the names of all sessions operating at that time are interpreted as the session names.

%none . . . Designation of "%none" indicates that the process does not belong to any specific session. Some processes operating in each user environment may be independent of a session.

%ignore . . . "%ignore" represents that the presence/absence of a session or the name of a session can be ignored. Designating "%ignore" is equivalent to designating [%all, %none] in meaning.

In the hierarchical level of user names,

%self
%all
%allbutself can be designated. The details of the individual special expressions are as follows.

%self . . . When "%self" is designated, the name of a user using a user environment which a tool by which the designation is done belongs to is interpreted as the user name.

%all . . . When "%all" is designated, the names of all users belonging to a session which is designated immediately before this designation are interpreted as the user names.

%allbutself . . . When "%allbutself" is designated, the names of all users, except for a "%self" user, belonging to a session which is designated immediately before this designation are interpreted as the user names. Accordingly, [%self, %allbutself] has the same meaning as %all.

Finally, in the hierarchical level of tool names,

%self
%selfonly
%super
%parent
%all can be designated. The details of the individual special expressions are as follows.

%self . . . When "%self" is designated, the name of a tool by which this designation is done is interpreted as the tool name. If this tool is a subtool of some other tool, a hierarchical structure (except for the user name) after the user name of that tool is directly added.

%selfonly . . . When "%selfonly" is designated, the name of a tool by which this designation is done is interpreted as the tool name. Even if this tool is a subtool of some other tool, the hierarchical relationship between these tools is ignored.

%super . . . When "%super" is designated, the tool hierarchical levels up to a hierarchical level immediately above a tool by which this designation is done are interpreted as the tool names. Accordingly, designating &%super&%selfonly is equivalent to designating &%self.

%parent . . . When "%parent" is designated, the tool path goes back to a hierarchical level immediately above a tool hierarchical level designated by an immediately preceding tool path. While %super completely ignores a path which is designated immediately before the designation of this special expression, %parent has a meaning which depends upon a path designated immediately before the designation of this special expression.

%all . . . When "%all" is designated, all tools belonging to the designated tool hierarchical levels in an immediately preceding tool path are designated.

By combining the special expressions as described above, the following tool paths, for example, can be expressed.

EXAMPLE 1

&%current&%all&%self

This indicates copies of a tool by which this tool path is designated in all user environments of a session which the process currently belongs to. "Tool copies" are tools having the same tool path except for the user name. The term "tool copies" is used since tools of exactly the same type are used in many cases.

EXAMPLE 2

&%current&%all&%super&%all

This indicates all tools existing in the same hierarchical level as a tool by which this tool path is designated in all user environments of a session which the process currently belongs to.

EXAMPLE 3

&%none&%user C&%super&%tool X

This indicates a tool whose tool name is "tool X" which exists in the same hierarchical level as a tool by which this designation is done in the user environment of a user C.

Figure 6:
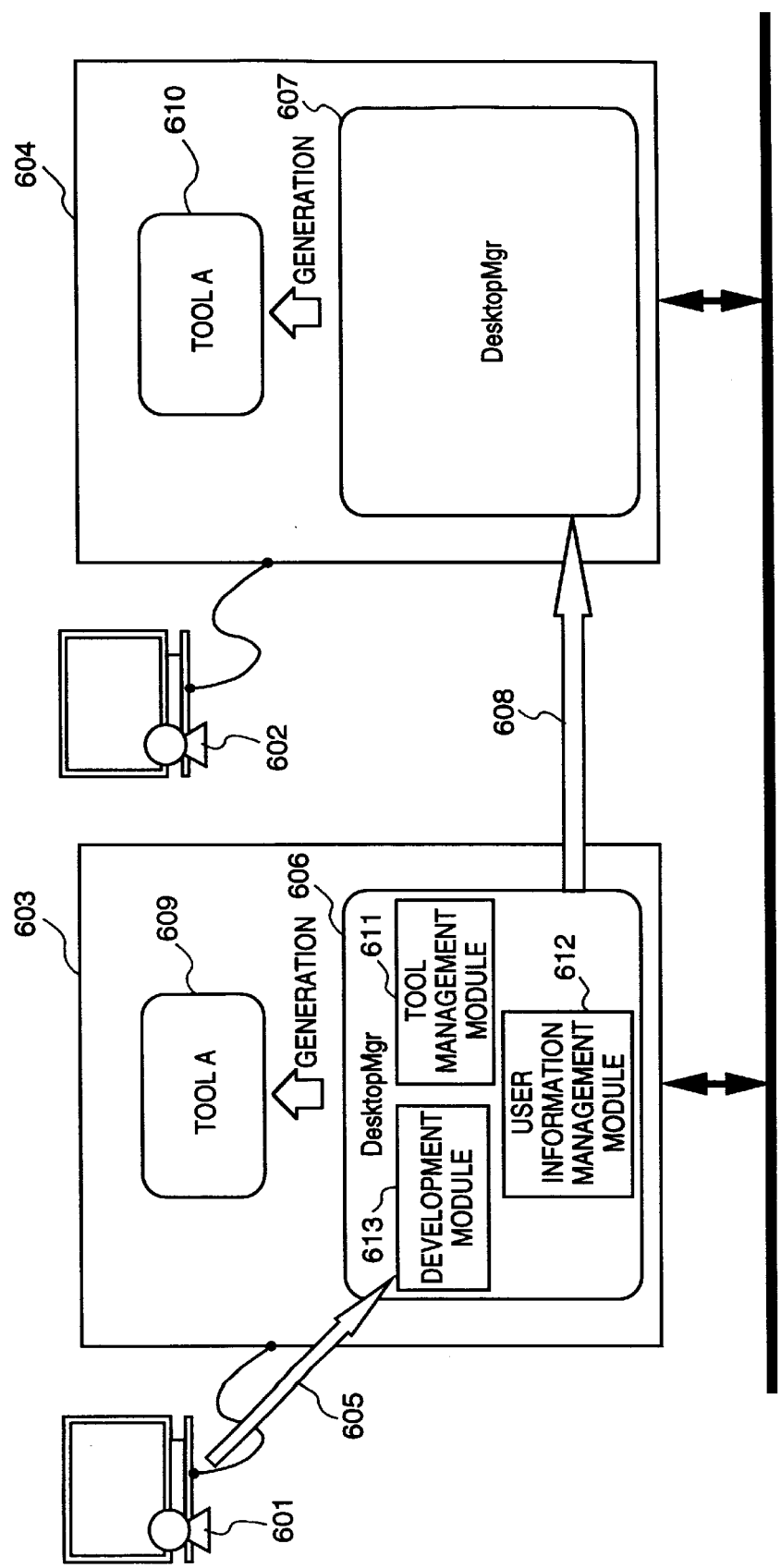
FIG. 6 is a view showing the way in which a tool is activated with activation of a session.
Figure 7:
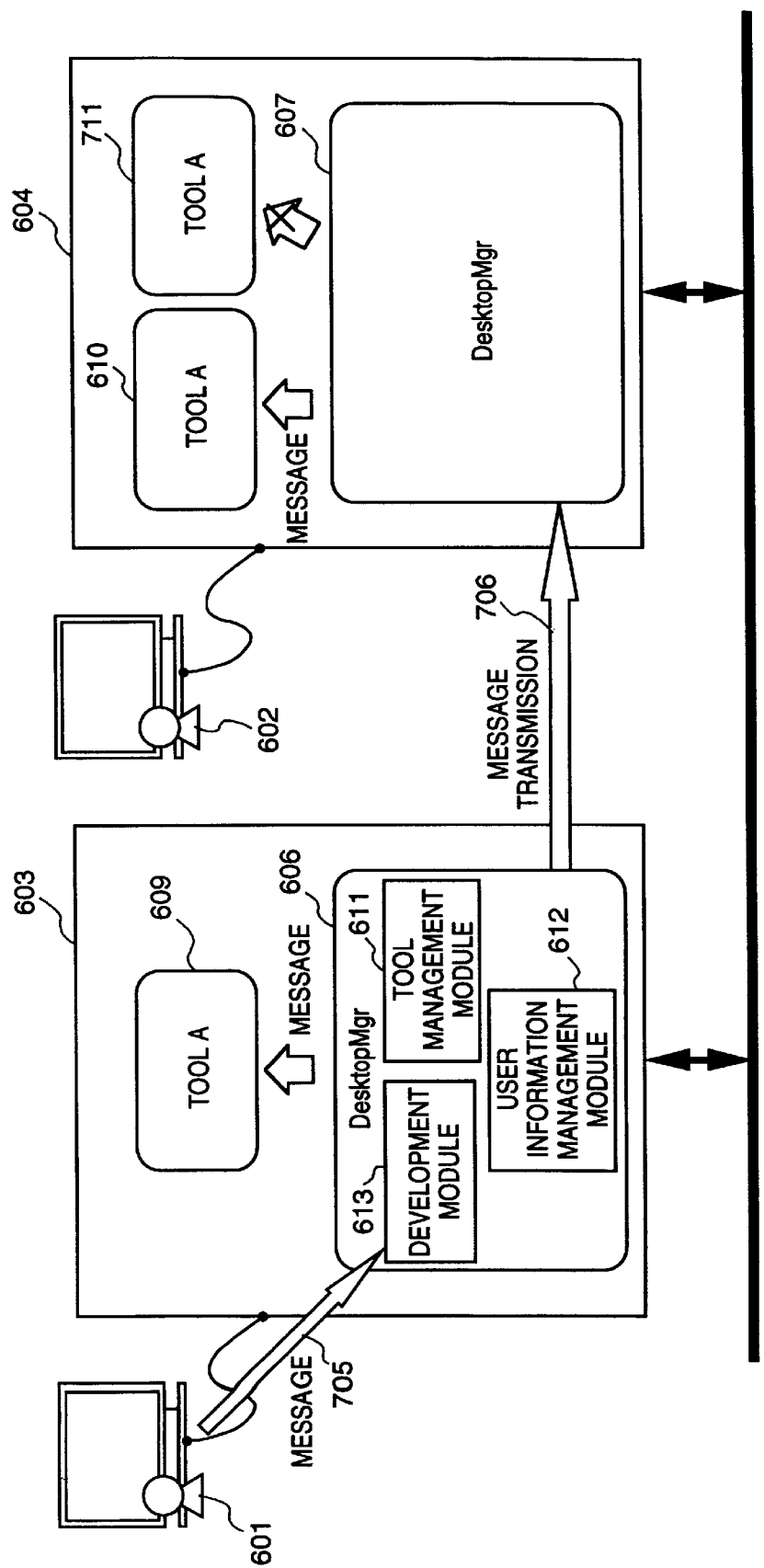
FIG. 7 is a view for explaining a message transmission mechanism using a tool path in this embodiment.

In this embodiment, the tool paths introduced as described above are used to control tools. FIGS. 6 and 7 illustrate this control.

Figure 8:
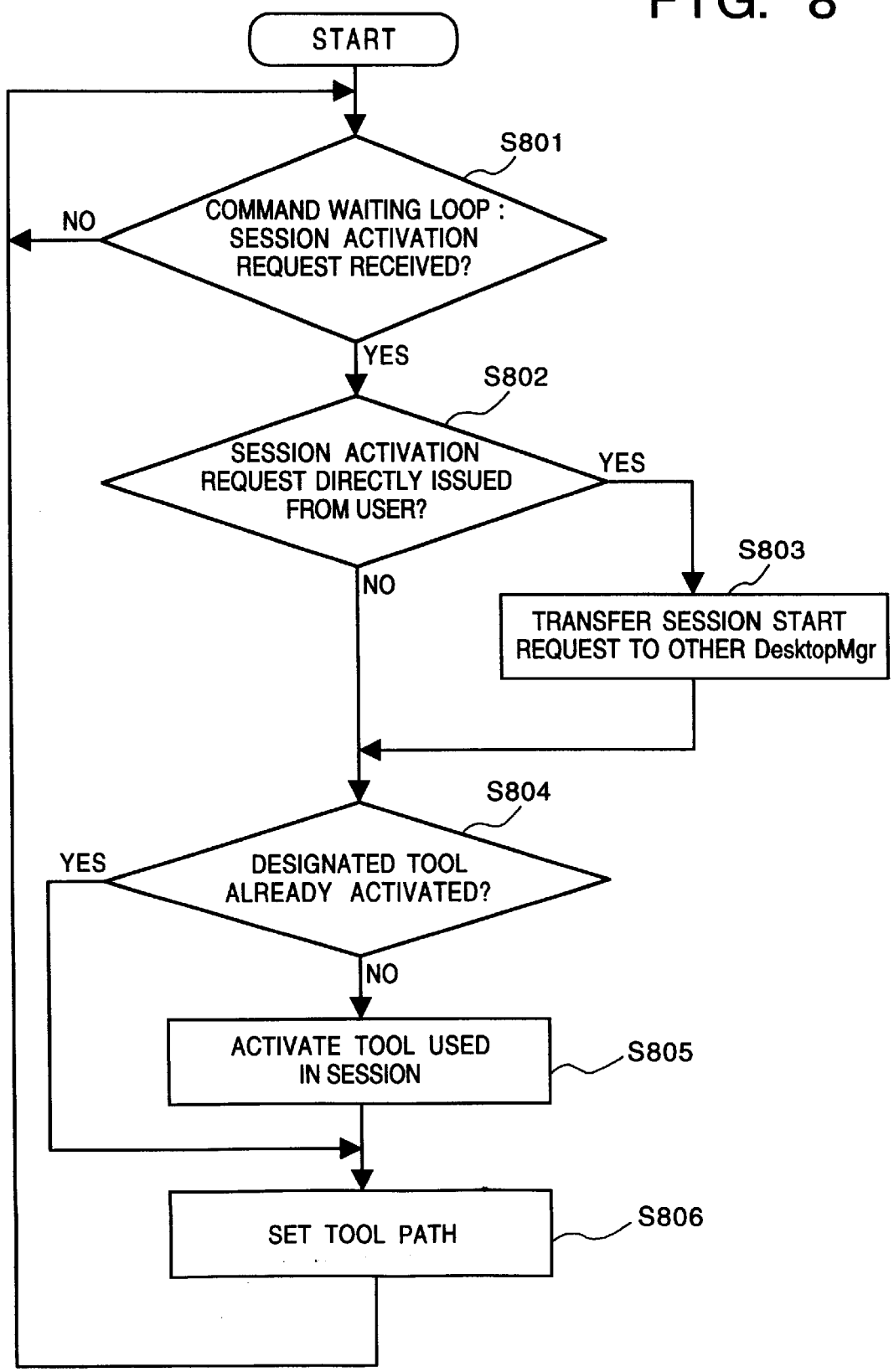
FIG. 8 is a flow chart showing the operation of a DesktopMgr in activating a session.

FIG. 6 shows the way a tool is activated with activation of a session. FIG. 8 is a flow chart showing the behavior of a DesktopMgr in the process of activation.

Assume that two users A 601 and B 602 intend to start a joint work in user environments 603 and 604, respectively. A joint work is started by activating a session expressing this joint work. In FIG. 6 it is assumed that the user A 601 activates the session.

A session activation request 605 from the user A 601 is transmitted to DesktopMgr 606 which manages the user environment on PC 603. Upon receiving the session activation request 605 (step S801), the DesktopMgr 606 checks whether this request is issued from a user or transferred from another DesktopMgr (step S802). Since this request is issued from a user, the DesktopMgr 606 transfers the session activation request 605 to the other DesktopMgr (step S803). Necessary information for communicating with the DesktopMgr in another user environment is managed by an internal user information management module 612 of the DesktopMgr 606.

The name of a user to be participated in the session is designated by the user A 601 who is going to activate the session. Also, a session activation request 608 to another user (in this case the user B 602) contains information for designating the name of the session, the names of all participating users, and tools to be activated.

The DesktopMgr 606 then checks from tool information managed by a tool management module 611 whether a tool A 609 used in the session is already activated (step S804). If NO in step S804, the DesktopMgr 606 activates the tool A609 (step S805).

In step S806, the DesktopMgr 606 sets the tool path of that tool and the flow returns to the command waiting loop (step S801). The set tool path is managed by a development module 613 of the DesktopMgr 606. If a session start request is issued to other DesktopMgr in step S803, a corresponding tool path also is managed by the development module 613. Since the session start request is issued to the user B, a tool path of the tool A in the user B is registered. As a result, a tool path as illustrated in FIG. 5 is registered in the development module 613. On the basis of the tool path thus registered, development of a message transfer command (to be described later) is performed.

Meanwhile, DesktopMgr 607 which manages the user environment of the user B 602 receives the session activation request 608 transferred from the DesktopMgr 606. Since this activation request is not directly issued from the user B 602, the flow advances from step S802 to step S804, and the DesktopMgr 607 immediately activates a tool A 610 used in the session (steps S804 and S805).

In step S806, the DesktopMgr 607 sets the tool path of that tool and the flow returns to the command waiting loop (step S801). The set tool path is registered in a development module (not shown) of the DesktopMgr 607. Note that a tool path similar to that registered in the development module 613 of the source of the activation request is registered in the development module which has received the session activation request, in accordance with the names of the participating users and the names of the activated tools contained in that session activation request. Consequently, development of a message command (to be described later) can be accomplished by all users participating in the session.

The activation of the tool A609 is done by executing the following command:

launchTool "tool A""&session&user A&tool A" The meaning of this command is to activate the tool A 609 and give the name "&session&user A&tool A" to the activated process. Thereafter, the process of the tool A 609 thus activated can be designated by the tool path "&session&user A&tool A".

Upon receiving the session activation request 608, the DesktopMgr 607 also executes the following command:

launchTool "tool A""&session&user B&tool A" to activate the tool A 610. Thereafter, the process of the activated tool A 610 can be designated by the tool path "&session&user B&tool A".

Figure 9:
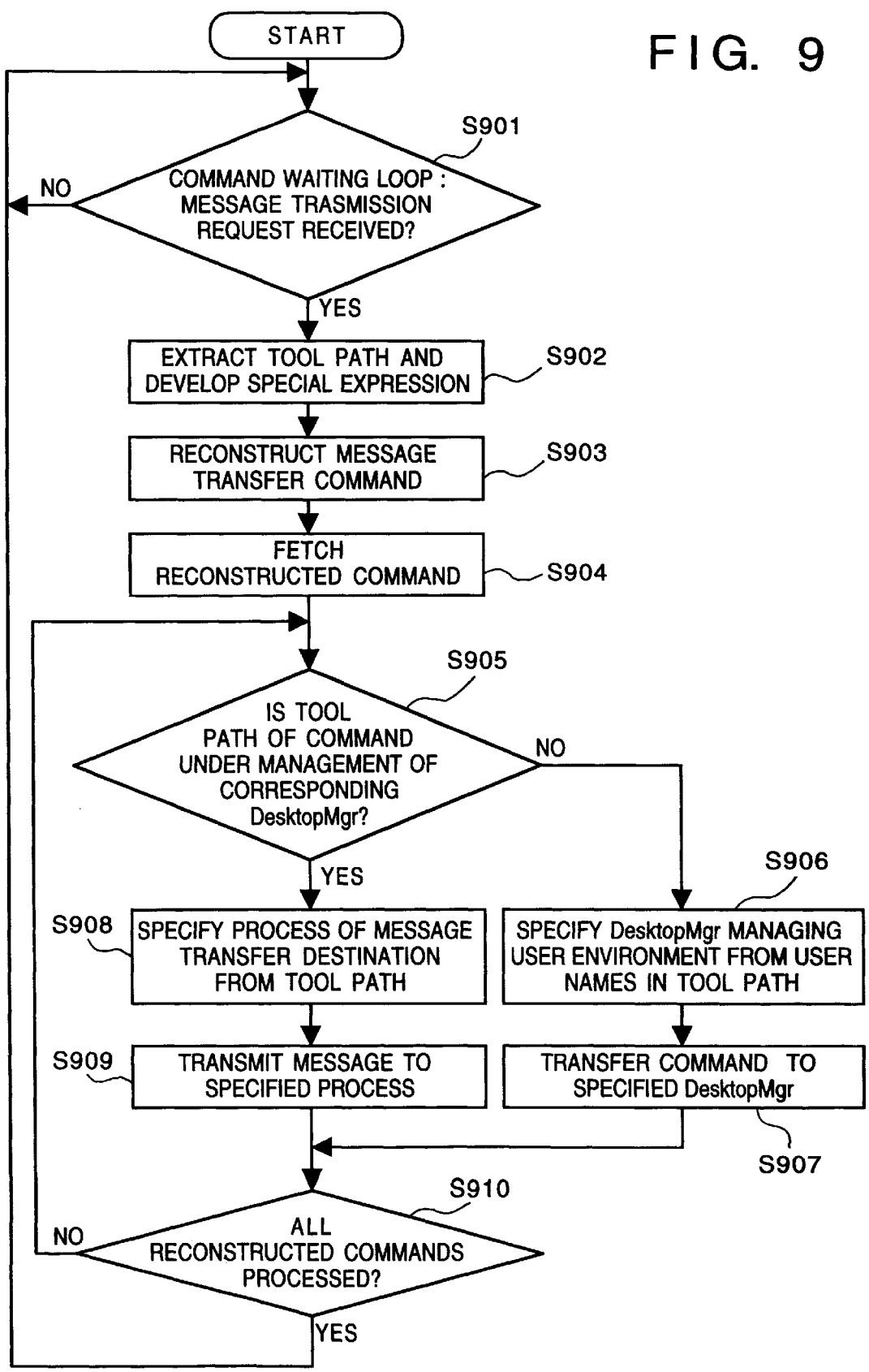
FIG. 9 is a flow chart showing the operation of a DesktopMgr in transmitting a message.

FIG. 7 is a view for explaining the mechanism of message transmission using the tool paths in the first embodiment. FIG. 7 shows the state during the course of the joint work in the session activated in FIG. 6. FIG. 9 expresses the behavior of the DesktopMgr in this situation in the form of a flow chart. In FIG. 7, assume that the user A 601 issues a message transfer command 705 presented below to the DesktopMgr 606.

This message transfer command is represented by forwardMessage "&session&%all&%tool A" "do-something" The meaning of this command is to "transfer a message "do-something" to the tools A of all users belonging to the session".

When the DesktopMgr 606 receives this message transfer command 705 (step S901), the development module 613 develops the special expression "%all" in the tool path "&session&%all&tool A" which is the first argument in the command, into a practical user name (step S902). This development is done by referring to the tool path registered upon activation of the session and the tool described above. The results of development in this example are "&session&user A&tool A"

"&session&user B&tool A"

After performing the development, the DesktopMgr 606 reconstructs the message transfer command on the basis of the results (step S903). In this case the following two commands are reconstructed.

forwardMessage "&session&user A&tool A" "do-something"

forwardMessage "&session&user B&tool A" "do-something"

In this manner a single command can be converted into a plurality of commands by development of a tool path. Although the DesktopMgr sequentially processes these commands in this embodiment, it is also possible to simultaneously process the commands.

The DesktopMgr 606 fetches one of the reconstructed commands (step S904), extracts therefrom the session name and the user name designated by the command, and checks whether the combination of the session and the user is under the management of the DesktopMgr 606 (step S905).

If the combination of the session and the user is not under the management of the DesktopMgr 606, the DesktopMgr 606 specifies, from the user information managed by the user information management tool 612, a communication port for the DesktopMgr which manages the environment of the user designated by the tool path (step S906), and transfers the command to that DesktopMgr (step S907).

On the other hand, if the designated tool is under the management of the DesktopMgr 606, the DesktopMgr 606 specifies the tool process designated by the tool path (step S908) and transmits the message (step S909).

The above processing is repeated until there is no command remaining (step S910). Note that the DesktopMgr on the side to which the commands are transferred by the processing in steps S906 and 907 performs the same processing as in the transfer source.

In the algorithm shown in FIG. 9, the DesktopMgr which receives a request for the first time develops all special expressions in a tool path. This embodiment, however, can also be realized by an algorithm, as another development procedure, in which the development in step S902 is limited to the session name and the user name, and the DesktopMgr which manages each individual user environment executes the development of the remaining tool name.

In the configuration shown in FIG. 7, for example, the tool path of the first command relates to the user environment of the user A, so the DesktopMgr 606 itself processes this first command. Since the tool path of the second command relates to the user environment of the user B, this command is transferred to the DesktopMgr 607 and processed by the DesktopMgr 607.

After transmitting the message transfer command 608, the DesktopMgr 606 transfers the message "do-something" to the process (i.e., the tool A 609) specified by "&session&user A&tool A". Analogously, upon receiving a message transfer command 706, the DesktopMgr 607 transfers the message "do-something" to the process (i.e., the tool A 610) specified by "&session&user B&tool A".

In FIG. 7, another tool A (tool A 711) happens to be activated. Since, however, a tool path different from that of the tool A 610 is designated for the tool A 711, the message is not transferred to the tool A 711.

In summary, this first embodiment is an embodiment in which the present invention is applied to an inter-application communication mechanism in a groupware system. The first embodiment introduces the tool paths using the hierarchical structure of sessions, user environments, tools, and subtools, and the special expressions on these tool paths. The first embodiment also introduces the DesktopMgr which controls tools by using the tool paths.

In the first embodiment as described above, the use of the hierarchical structure meeting the session structure in a groupware system facilitates managing the uniqueness of a tool designation. Also, the introduction of special expressions makes a more abstractive designation feasible when each tool designates the other party of communication. Consequently, it is possible to handle a dynamic change in the work environment caused by frequent participation and withdrawal of users in a groupware system.

Note that the above first embodiment does not use any particular data structure for managing the hierarchical structure; i.e., the hierarchical structure as illustrated in FIG. 5 is essentially managed by character strings representing tool paths. However, it is of course possible to manage the hierarchical structure, FIG. 5, by expressing it as another internal data structure.

<Second Embodiment>

In the above first embodiment the application of the present invention to a groupware system is described. The present invention is also applicable to an asynchronous data shared system centered around a database. Therefore, an embodiment in which the present invention is applied to a multimedia data retrieval system using a database will be described below.

Figure 10:
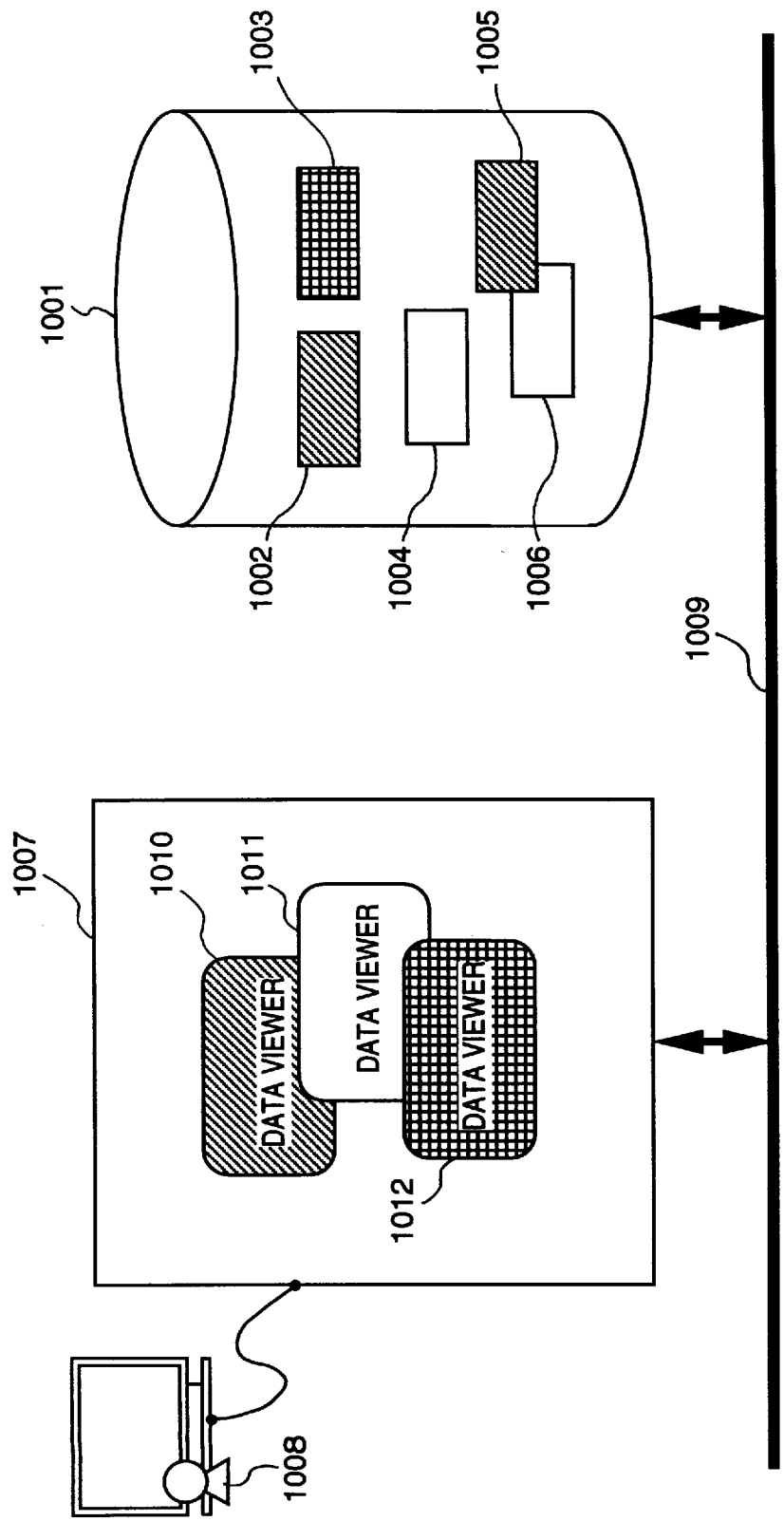
FIG. 10 is a view showing the outline of a multimedia data retrieval system according to the second embodiment.

FIG. 10 shows the outline of a multimedia data retrieval system according to the second embodiment. Referring to FIG. 10, a database 1001 manages multimedia data 1002 to 1006 such as image and voice data. This database 1001 is connected to PC 1007, as a client, which is used by a user 1008. Although only one PC is connected as a client to the database 1001 in FIG. 10, it is possible to connect a plurality of PCs or workstations as clients in practice. Also, the database 1001 itself can take a configuration in which it is distributed on a network 1009.

On the PC 1007, three different data viewers are activated and used to refer to respective corresponding multimedia data. An image viewer 1010 is used to refer to image data 1002 and 1005 in the database 1001, a dynamic image viewer 1011 is used to refer to dynamic image data 1004 and 1006, and a document viewer 1012 is used to refer to document data 1003. In FIG. 10, the correspondence of these viewers and data is indicated by the correspondence of background patterns (hatching and crosshatching) of the viewers and data.

Figure 11:
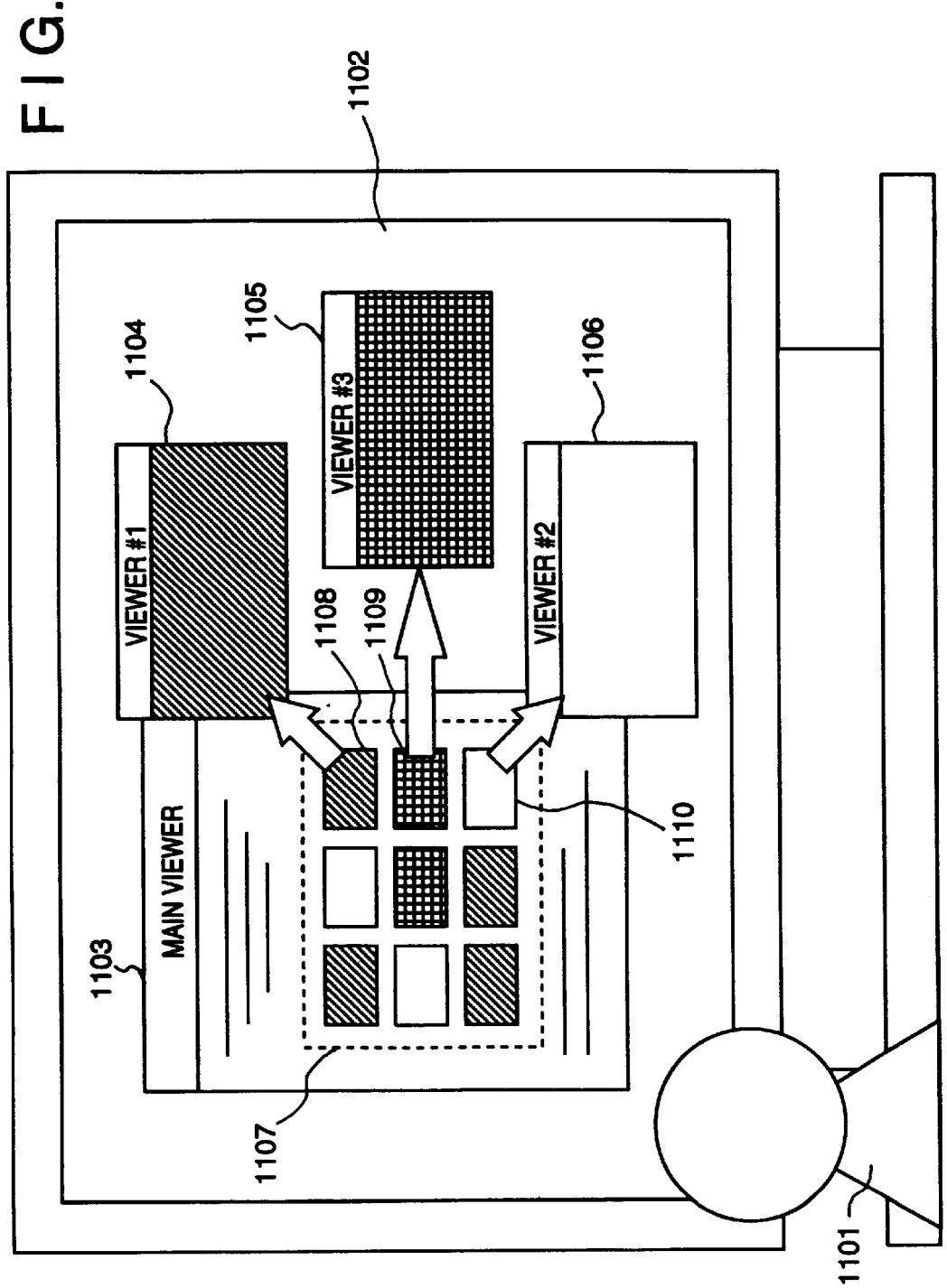
FIG. 11 is a view showing an example of the contents displayed in the second embodiment.

FIG. 11 illustrates how the second embodiment appears from the viewpoint of a user. In FIG. 11, a user 1101 is performing a work on a display 1102. This display 1102 is a display device of the PC 1007 as a client of the database, FIG. 10.

Four windows 1103, 1104, 1105, and 1106 are displayed on the display 1102, and these windows display respective corresponding multimedia data. The window 1103 provides the user interface of an application (database retrieval application) for retrieving desired data in the database. The windows 1104, 1105, and 1106 provide the user interfaces of still image, dynamic image, and document viewers, respectively.

The database retrieval application displays a catalogue 1107 of the multimedia data managed by the database in the window 1103. This catalogue consists of icons indicating data which can be referred to from the database retrieval application and a list of the names of the data. As some additional information, information such as the data size and the data formation date are added to the catalogue. When the user chooses icons (1108, 1109, and 1110) of given data from the catalogue, the database retrieval application displays the data in the respective corresponding viewers (1104, 1105, and 1106).

In effectuating this multimedia data retrieval system as a distributed system which can be accessed by various clients, it is not possible to assume that the individual clients have exactly the same environment (i.e., a data viewer).

Referring to FIG. 12, two users 1201 and 1202 are accessing a database 1205 by using PCs 1203 and 1204, respectively. These two users are referring to a catalogue of the same data by using database retrieval applications 1206 and 1207, but different data viewers are used to refer to the data. In FIG. 12, the data on the catalogue is referred to by three data viewers 1208, 1209, and 1210 in the environment of the user 1201, whereas the data can be referred to by two data viewers 1211 and 1212 in the environment of the user 1202.

An application of the present invention for meeting the situation as illustrated in FIG. 12 will be described below.

First, the data viewers in each user environment are named on the basis of the hierarchical structure of the catalogue names, the user names, and the viewer names. The resulting path expression is called a viewer path and represented as follows:

&catalogue name&user name&data viewer name&sub-data viewer name . . .

In this manner, in the second embodiment a hierarchy of the data viewer names is formed to realize integration of the data viewers, as in the first embodiment.

Special expressions in the path representation are then introduced. In the second embodiment, special expressions of catalogue names and user names are introduced. Details of special expressions in individual hierarchical levels will be described below.

In the hierarchical level of catalogue names,

%all can be designated. When "%all" is designated, the names of all catalogues existing in the database are interpreted as the catalogue names.

In the hierarchical level of user names,

%ignore

%group can be designated. The details of these special expressions are as follows.

%ignore . . . When "%ignore" is designated, user names are ignored.

%group . . . "%group" is used in the form of %group (group name). In this case the name in the parentheses is interpreted as the name of a group. A group is defined as a list of user names.

In this embodiment, this viewer path is used as data viewer designating information for each data in the database 1205. The viewer path is added to each data in the database 1205 and managed by the database 1205. A viewer for common data is designated as &%all&%ignore&data viewer name DesktopMgr is introduced as a server for managing the correspondence of viewer paths and actual viewers. One DesktopMgr exists in each user environment. The name "DesktopMgr" is the same as DesktopMgr in the first embodiment and the functions of the two are very similar, so it is also possible to integrate these two types of Desktop-Mgr's.

The viewer path added to each data in the database 1205 is set by the database 1205 for managing the data. The hierarchical level of catalogue names is a hierarchical level for specifying each data which the database 1205 manages. The hierarchical level of user names is a hierarchical level for specifying each PC. The hierarchical level of viewer names is a hierarchical level for specifying a viewer for displaying the data specified by the catalogue name. If the system environment changes, it is possible to meet the change in the system environment by changing this viewer path.

Figure 14:
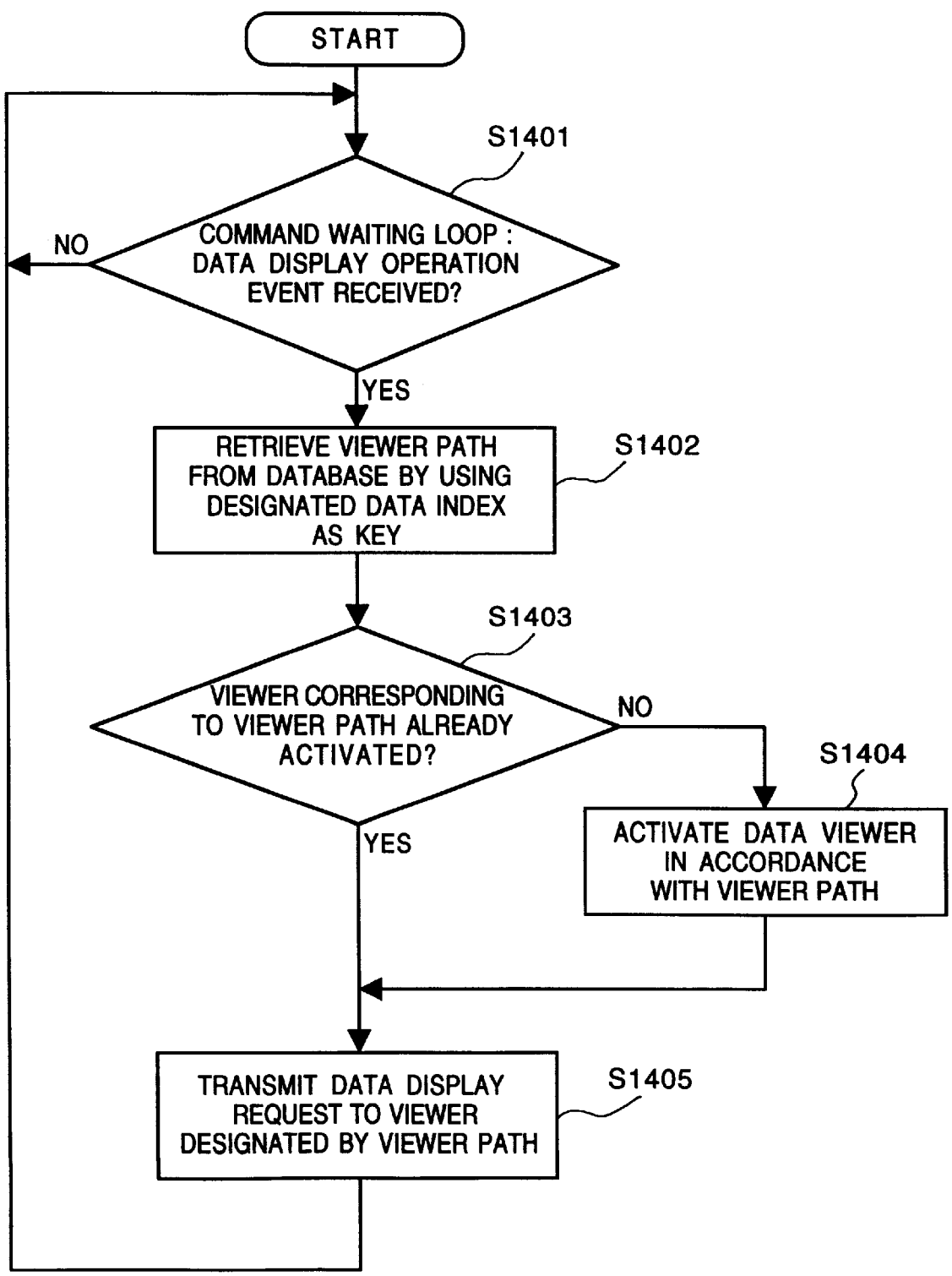
FIG. 14 is a flow chart showing the operation of a DesktopMgr in the second embodiment.

FIG. 13 shows data referring processing in the second embodiment using the viewer paths and the DesktopMgr. FIG. 14 is a flow chart showing the operation of the DesktopMgr as the core of the processing.

FIG. 13 shows processing when a user 1301 requests reference to data by designating an icon 1303 in a window 1302 of a database retrieval application. A database retrieval application 1305 is informed of the operation done by the user 1301 as an event 1304 on the display. The database retrieval application 1305 interprets the event 1304, detects that the icon 1303 is designated, and issues a request for transmission of a request for displaying data 1307, as the main body of the icon 1303, to DesktopMgr 1308.

Upon receiving this request (step S1401), the Desktop-Mgr 1308 retrieves a viewer path added to the data 1307 from a database 1306 (step S1402). The DesktopMgr 1308 then checks whether a data viewer corresponding to the viewer path is already activated (step S1403). If the corresponding data viewer is not activated or in an inoperable state, the DesktopMgr 1308 activates the data viewer (step S1404). In FIG. 13, a data viewer 1309 is activated. If the data viewer 1309 is already activated and capable of displaying the corresponding data, the DesktopMgr 1308 transmits a display request 1310 for the data 1307 to the data viewer 1309 (step S1405). The data viewer 1309 executes the transmitted display request, and reference to the data is thus made possible as requested by the user.

As described above, this second embodiment is an embodiment of the present invention in a multimedia data retrieval system which permits customizing by each client. The second embodiment introduces the viewer paths which use the hierarchical structure of catalogues, user environments, viewers, and subviewers, and the special expressions on these viewer paths. The second embodiment also introduces the DesktopMgr for controlling viewers by using the viewer paths.

As described above, in the second embodiment it is possible to designate a data viewer suited to each individual user environment in various hierarchical levels on the viewer path. For example, by restricting the user name of the viewer path it is possible to perform control such that reference is allowed only for a specific user or partial reference is permitted. Furthermore, since the DesktopMgr manages viewers in the user environments, the costs of development and introduction of database retrieval applications and various data viewers can be reduced.

In the first and second embodiments as described above, it is possible to provide a flexible inter-application cooperative system capable of meeting a complicated environment in which the components can dynamically change, in a system constituted by a plurality of computers.

In the first and second embodiments, it is also possible to manage applications with a high abstraction level in a complicated environment in which the components can dynamically change.

Furthermore, in the first and second embodiments it is possible to construct applications operating in a complicated environment in which the components can dynamically change, without particularly taking account of the environment.

<Third Embodiment>

Figure 15:
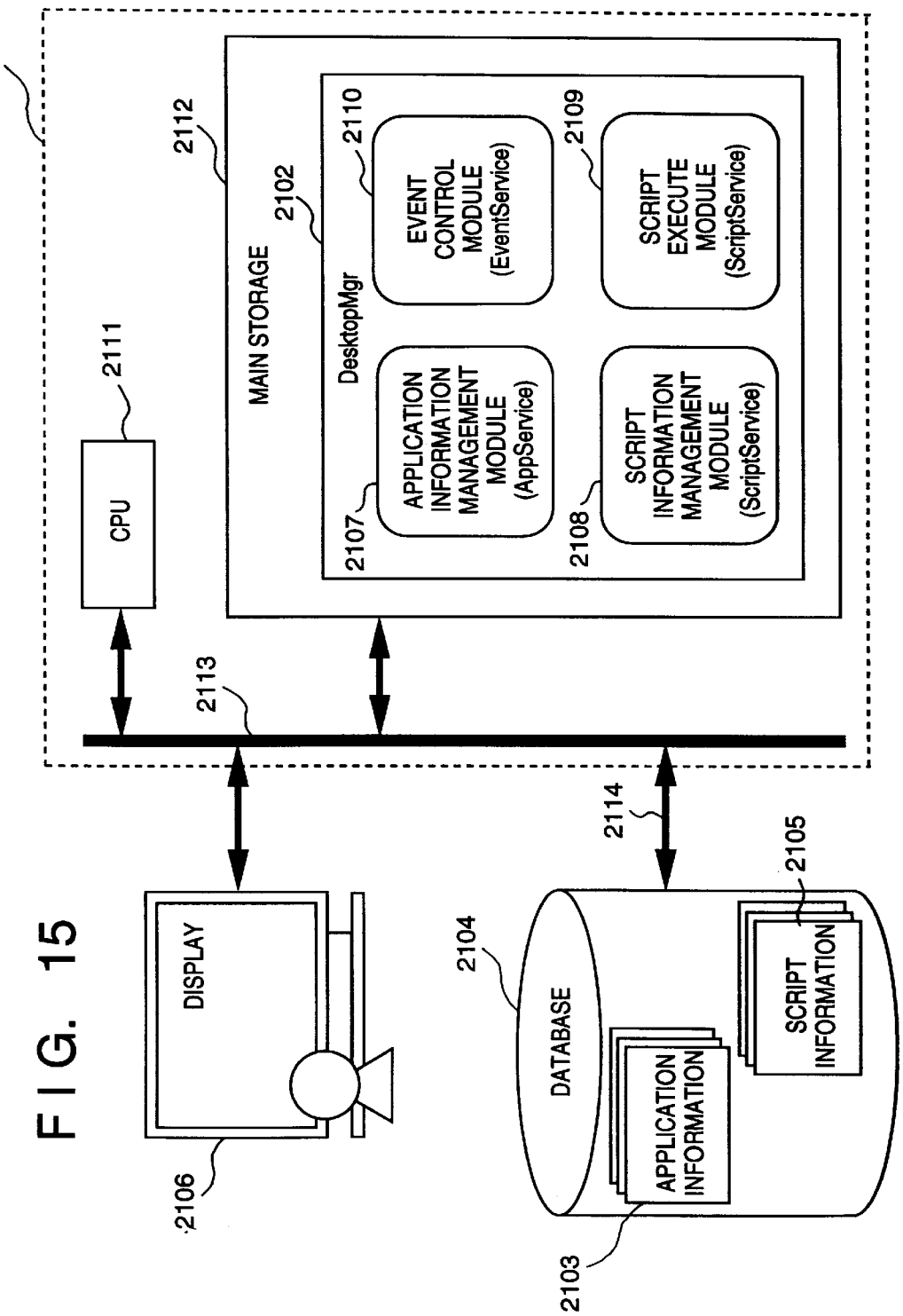
FIG. 15 is a view showing the outline of an integrated application management system according to the third embodiment.

FIG. 15 is a schematic view of an integrated application management system according to the third embodiment. This integrated application management system links a plurality of applications and makes them behave as if they are a single application. In the third embodiment, a logical unit which simultaneously manages a plurality of applications operating in association with each other is called an "integrated application". The integrated application management system provides a mechanism for realizing this integrated application.

Note that the integrated application in this third embodiment is constituted by element applications (to be described later). That is, the integrated application and the element application in the third embodiment correspond to the integrated tool and the element tool, respectively, in the first and second embodiments. Accordingly, the mechanism of linking the integrated and element applications explained in the third embodiment can be applied as a tool for use in the groupware in the first and second embodiments.

Referring to FIG. 15, a workstation 2101 is constructed by connecting a CPU 2111 for executing the processing of this embodiment and a main storage 2112 for holding Desktop-Mgr 2102, as basic software of this integrated application management system, through a computer bus 2113.

Data which the DesktopMgr 2102 uses to manage applications is called application information 2103. The DesktopMgr 2102 manages this information by using a database 2104. This database 2104 is a common database, such as a relational database or an object-oriented database, by which data retrieval is possible. The database 2104 and the workstation 2101 are connected by an Ethernet cable 2114. The database 2104 is also used in management of script information 2105 which defines the operation of the integrated application. A user interface by which a user performs operations of applications, such as input and output applications, is displayed on a display 2106.

The DesktopMgr 2102 consists of four internal software modules, i.e., an application information management module 2107, a script information management module 2108, a script execute module 2109, and an event control module 2110. Each of these modules will be described below.

[Application Information Management Module 2107]

The application information management module (AppService) 2107 provides users, applications, or other software modules with a means for managing the application information 2103 and performing application control, such as activation and termination of an application, based on the application information.

[Script Information Management Module 2108]

The script information management module (ScriptService) 2108 manages the script information 2105. The script information 2105 defines how the DesktopMgr behaves with respect to an operation (called an "event" by regarding it as an incident with respect to the integrated application) performed for the integrated application. In this embodiment, this "behavior" is described in a simple script language. A program described in this script language is simply called a "script".

[Script Execute Module 2109]

The script execute module (ScriptEngine) 2109 executes processing described in the script information 2105. That is, this module is implemented as an interpreter for the script language used to describe the script information.

[Event Control Module 2110]

The event control module (EventService) 2110 controls the operation of the entire DesktopMgr 2102, i.e., the operation of receiving and processing an event sent from a user or an application.

In this third embodiment, these modules are combined into a single program, the DesktopMgr 2102. However, it is also possible to install these modules in a form in which the modules function as independent programs.

Figure 16:
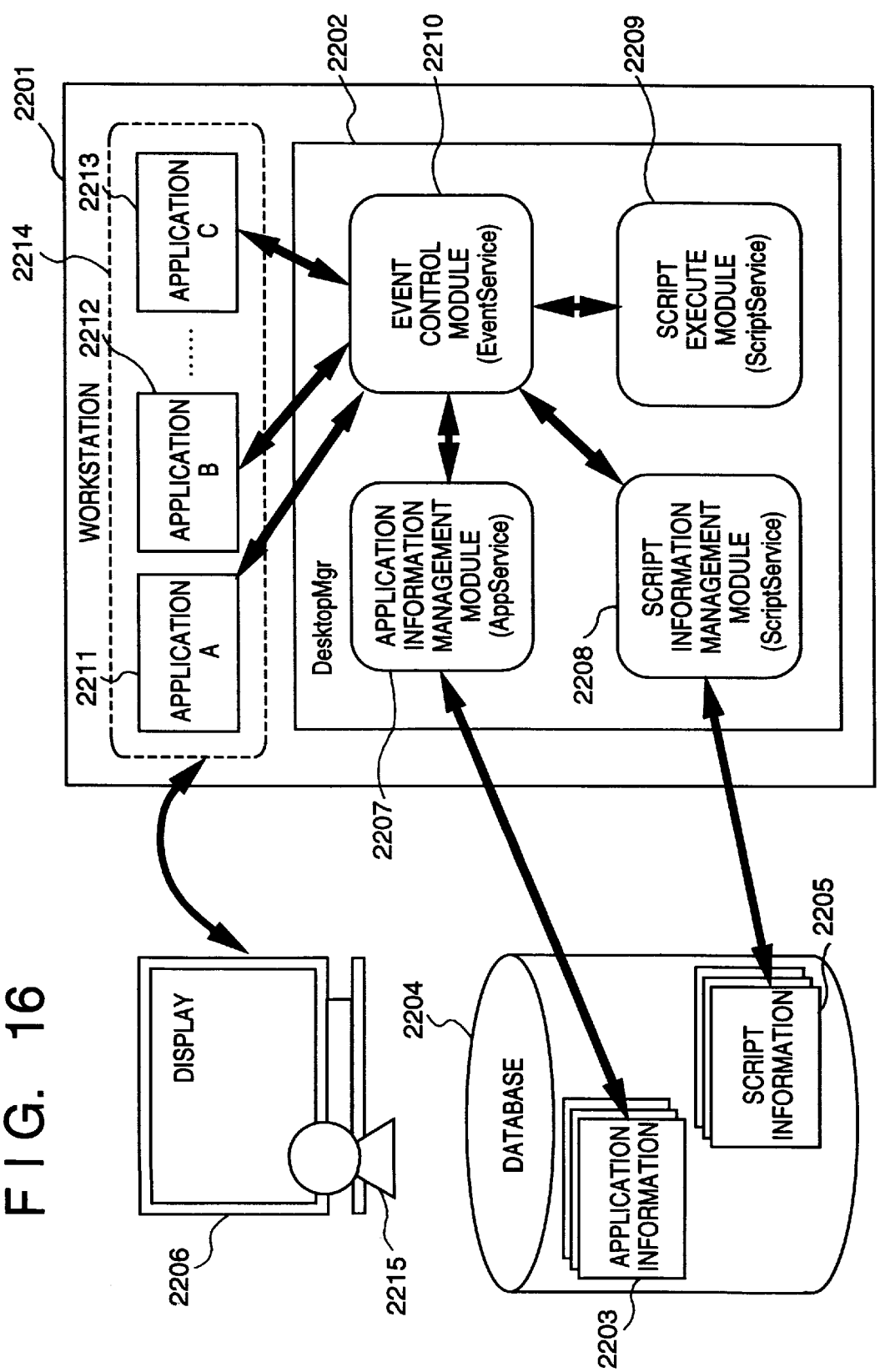
FIG. 16 is a view showing the concept of an application linkage in the third embodiment.

FIG. 16 illustrates the concept of an application linkage in the third embodiment. In FIG. 16, parts 2201 to 2210 correspond to the parts 2101 to 2110 in FIG. 15, respectively. In FIG. 16, applications A 2211, B 2212, and C 2213 form an integrated application 2214 under the management of DesktopMgr 2202. Applications such as the applications A2211, B 2212, and C 2213 which function as the components of an integrated application are called element applications. As in the master system and the communication system described in "BACKGROUND OF THE INVENTION", the element applications in this third embodiment have an interprocess communication mechanism by which these applications operate in association with each other.

Assume a user 2215 performed, on the application A 2211, an operation to be processed by the whole integrated application 2214. In the third embodiment, an operation done by a user which is to be processed by the whole integrated application 2214 is defined as an event. Also, an "incident" which is secondarily brought about by such a user operation and to be processed by the whole integrated application 2214 is processed as an event.

An event is given a name (event name). An event in this system is defined by registering script information, which defines processing to be performed when an event occurs, in an application information management module 2207. The application A 2211 informs the DesktopMgr 2202 of such a user operation as an event. This event information mechanism can be implemented by issuing, as a message, a character string indicative of the name of an event to the DesktopMgr 2202 by using the user operation as a trigger.

Note that all element applications belonging to a single integrated application need not have this event information mechanism, i.e., an integrated application can function as long as at least one element application has the mechanism. An element application with this mechanism is also called a UI provider since it can provide the user interface of an integrated application.

When script information corresponding to the informed event exists, the DesktopMgr 2202 analyzes and executes the script information. In many cases the DesktopMgr 2202

(1) sends a message to other applications 2212 and 2213 or to the application A 2211 itself, (2) terminates currently operating applications, and (3) activates a new application. This procedure is handled as processing of the whole integrated application 2214.

Figure 17:
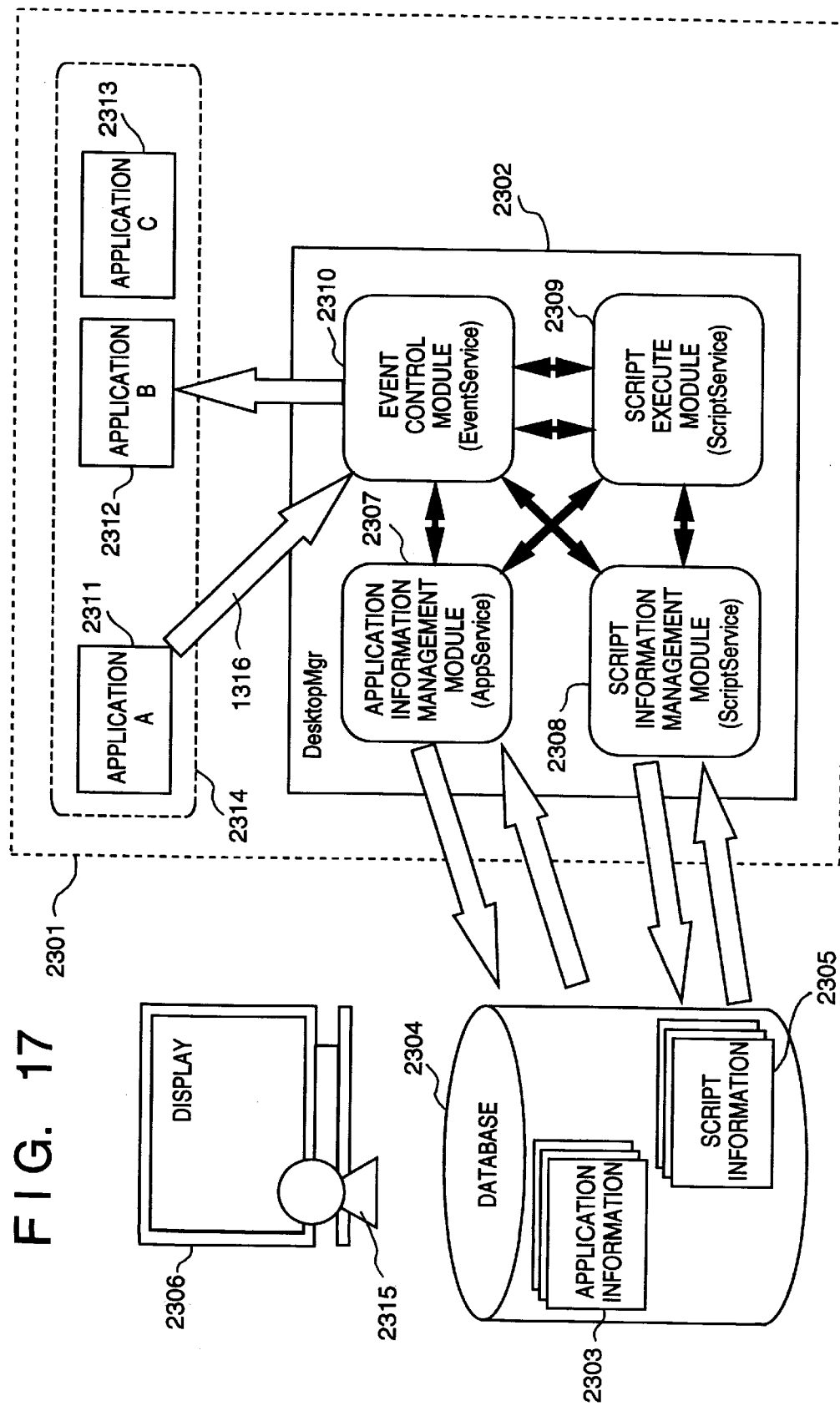
FIG. 17 is a view showing how processing is performed in the DesktopMgr in FIG. 16.
Figure 18:
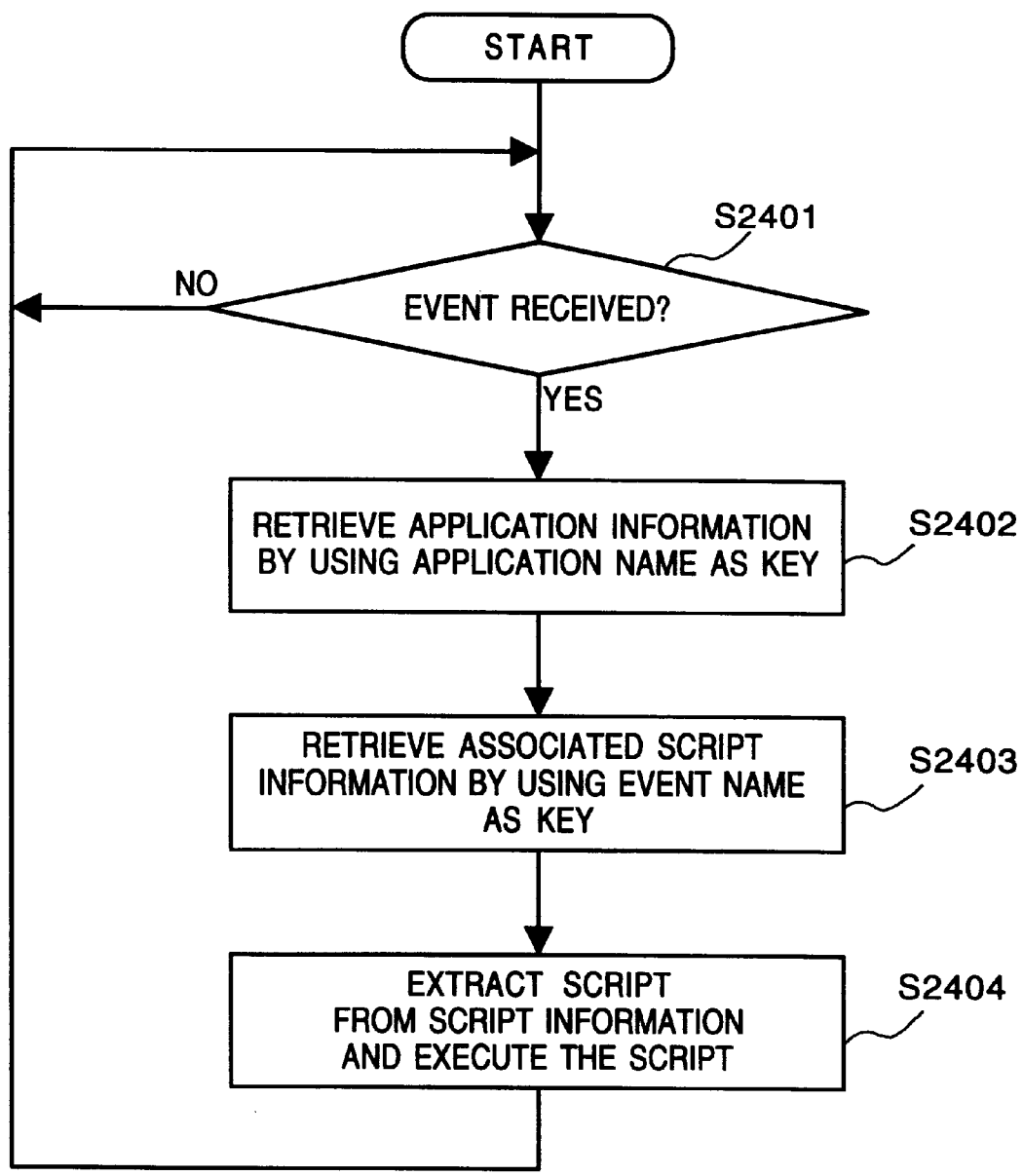
FIG. 18 is a flow chart showing the flow of processing in the third embodiment.

FIG. 17 shows the internal processing of the DesktopMgr 2202 in FIG. 16. Parts denoted by reference numerals 2301 to 2315 in FIG. 17 correspond to the parts denoted by reference numerals 2201 to 2215 in FIG. 16. FIG. 18 is a flow chart showing the flow of the processing in the third embodiment. The processing in the third embodiment will be described below with reference to FIGS. 17 and 18.

An event 2316 sent from an application A2311 is received by EventService 2310 (step S2401). The EventService 2310 requests AppService 2307 to retrieve application information 2303 of the application A2311 which is the issuer of the event. Assume that an application name used as the key of retrieval is always added to the sent event. The AppService 2307 retrieves the application information 2303 from a database 2304 by using the application name added to the event as the key (step S2402). In the third embodiment, the application information 2303 is defined as follows as a data structure in the C++ program language:

```
class ApplicationInfo {
    char* appName;
    int portNumber;
    int processNumber;
    ...
    ApplicationInfo* integrated_in;
    ListOf<ApplicationInfo> components;
    ListOf<char*> eventNames;
};
```

In the above description, appName is the application name used as an identifier of an application. The attribute eventNames in the application information 2303 manages a list of event names associated with the application. This event name is used as the key of retrieval of script information. If the application is a part of an integrated application, a pointer to application information of the integrated application is registered in integrated_in. If this application itself is an integrated application, the attribute "components" manages a pointer to information of applications as components of the integrated application.

In the third embodiment, an integrated application itself has corresponding application information. This makes it possible to meet the circumstances in which one integrated application is a component of another integrated application. A mechanism of generating application information including information of an integrated application will be described later. Information such as the process number processNumber and the port number portNumber necessary for control and communication of applications also are managed in the application information.

The EventService 2310 requests ScriptService 2308 to retrieve script information 2305 associated with the event 2316 as an object to be processed. The ScriptService 2308 retrieves the script information 2305 by using the retrieved application information 2303 and the name of the event 2316 to be processed as the keys (step S2403).

The script information itself is defined as follows in, for example, the C++ program language:

```
class ScriptInfo {
    char* eventName;
    ApplicationInfo* owner;
    char* scriptText;
};
```

In this description, eventName is the name of an event associated with this script information. "owner" is a character string representing application information of an application which uses this script information. The last scriptText is a character string representing a program described in a script language. In the third embodiment the script language is the TCL program language added with several commands (the TCL program language is described in John K. Ousterhout, "Tcl and the Tk Toolkit", Addison-Wesley, 1994). It is also possible to replace the TCL program language by similarly extending another script language. The event is processed when ScriptEngine 2309 analyzes this script (step S2404).

The use of the extension commands of the TCL program in the third embodiment makes it possible to combine functions provided by the individual element applications. The added commands are classified into the following three categories:

Operation of application information

Operation of applications

Operation of script information

Each category will be described in detail below.

[Operation of Application Information]

Application information is referred to and updated. The following commands belong to this category:

(1) AppInfo "application name" create (2) AppInfo "application name" info

"attribute name"?"attribute value" ?

The command (1) corresponds to creation of application information, and the command (2) corresponds to reference and update of application information. The attribute name is a character string representing the name of an instance variable declared in the ApplicationInfo class. In the above description, an item sandwiched between "?"s need not be designated. In the case of the command (2), if "attribute value" is given the value of the attribute of application information represented by "attribute name" is updated. If "attribute value" is not given, the command means reference.

[Operation of Applications]

The following commands for controlling applications belong to this category:

(3) LaunchApp "application name"

(4) terminateApp "application name"

The commands (3) and (4) activate and terminate, respectively, a designated application. Although these operations are finally done by using the function of an operating system on which this embodiment is activated, necessary information for the purpose is fetched from the application information.

Also, a command (5) forwardmessage "application name""text of message"

belongs to this category. The command (5) transfers a message to a designated application. By this command a function provided by an element application is utilized. In this embodiment, a message is handled as a character string.

[Operation of Script Information]

Script information corresponding to an event is referred to and updated. A command belonging to this category is (6) ScriptInfo "event name" info "attribute name""attribute value"

The command (6) refers to and updates the attribute value of script information corresponding to a designated event.

Examples of scripts which enable linkage of applications by combining the above commands will be described below.

Ex. 1

Activation of an integrated application IntegWork is defined as an event. The script is

```
[Ex. 1]
Activation of an integrated application IntegWork
is defined as an event. The script is
    set component_tools [AppInfo IntegWork info
    components];
    foreach tool $component_tools {
        launchApp $tool;
    }
This script fetches the values of a list "components"
of an element application from the application
information of IntegWork and activates all applications
in the list.
[Ex. 2]
Termination of IntegWork is done by
    set component_tools [AppInfo IntegWork info
    components];
    foreach tool $component_tools {
        terminateApp $tool;
    }
This script terminates an element application.
[Ex. 3]
To allow an element application named Editor to
process an event called "do_something" for IntegWork,
    forwardMessage Editor "do_something"
is described.
```

This script fetches the values of a list "components" of an element application from the application information of IntegWork and activates all applications in the list.

Ex. 2

Termination of IntegWork is done by set component_tools [AppInfo IntegWork info components];

foreach toll $component_tools { terminateApp $tool; This script terminates an element application.

Ex. 3

Figure 19:
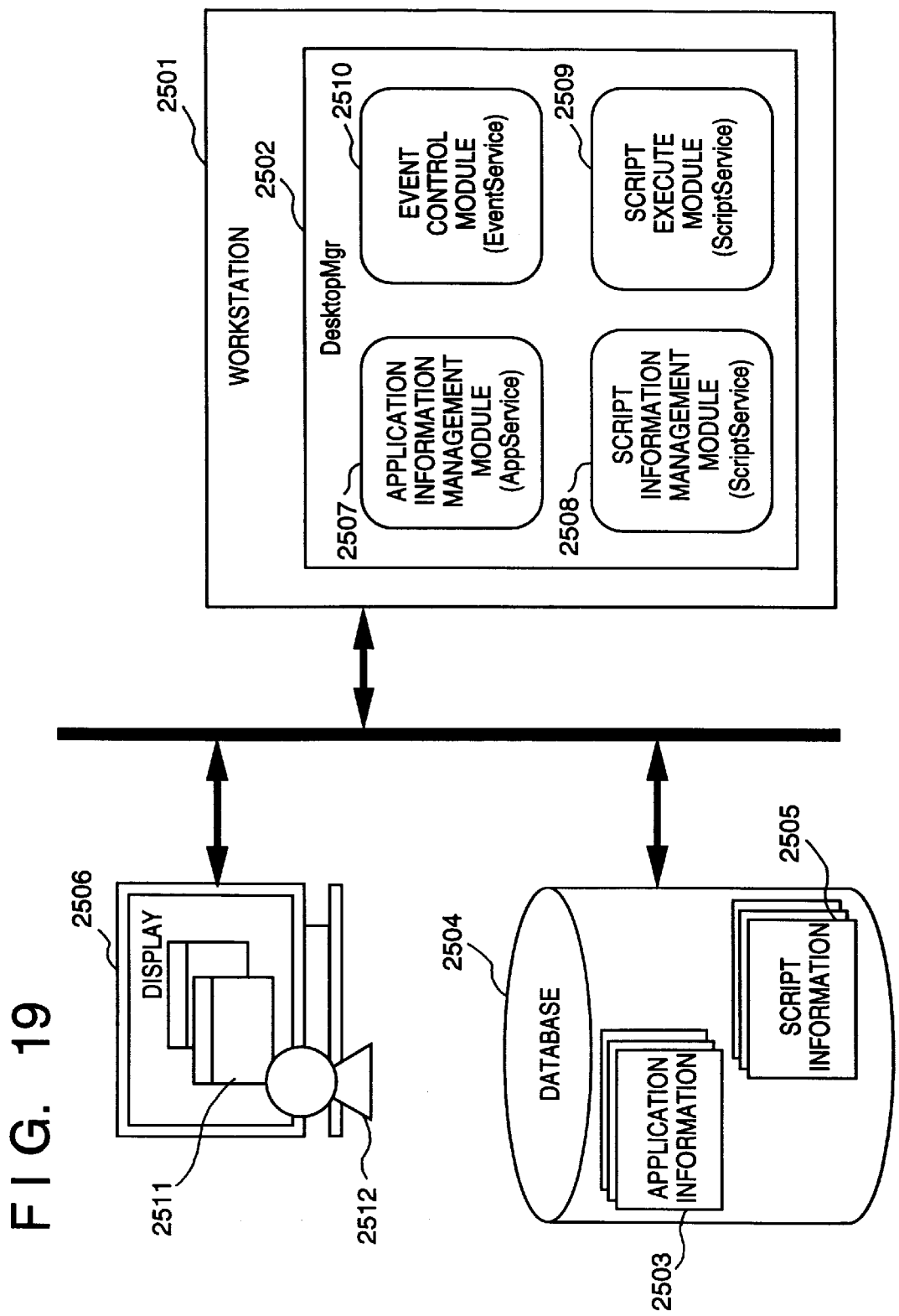
FIG. 19 is a view for explaining the outline of integrated application formation processing.
Figure 20:
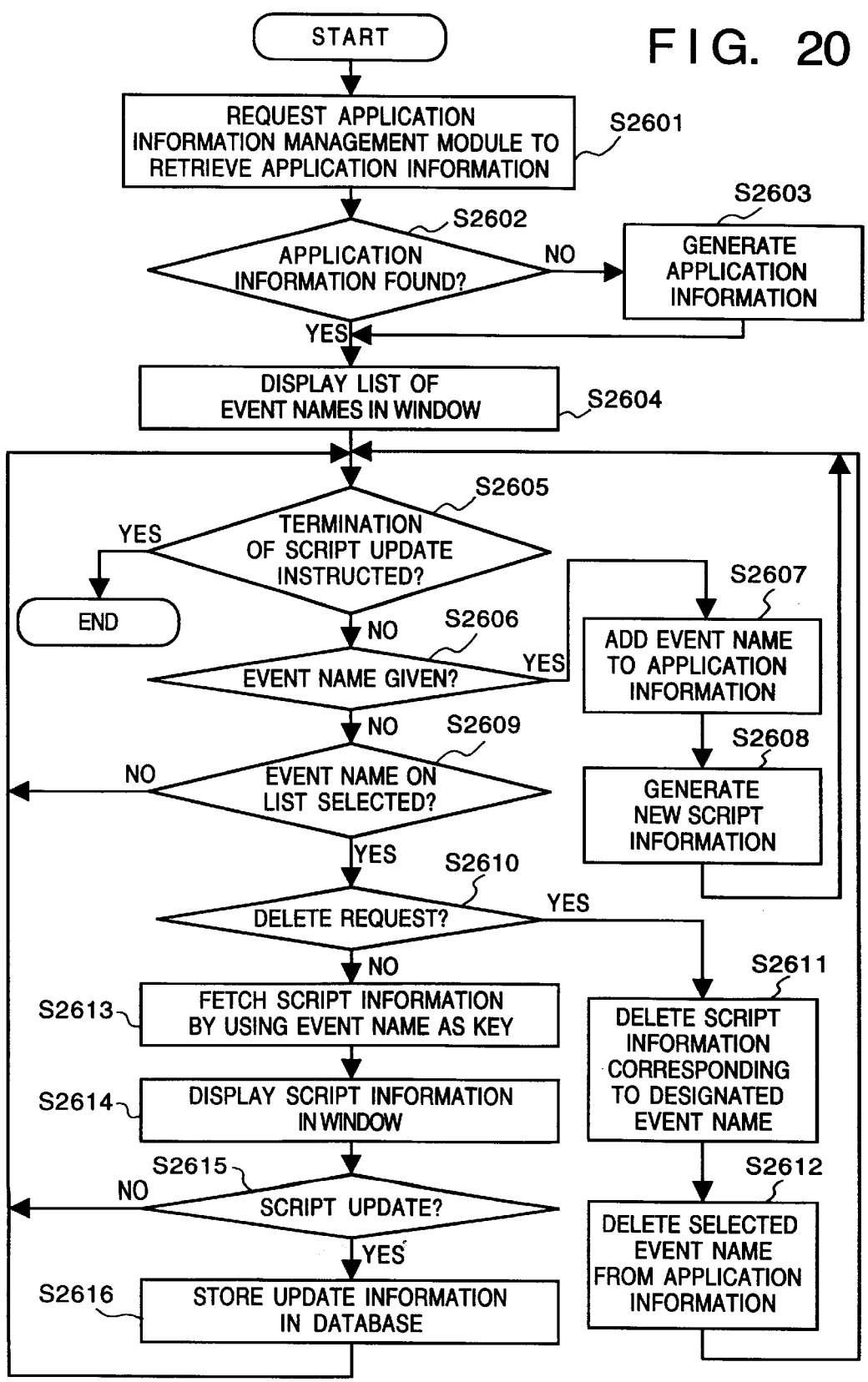
FIG. 20 is a flow chart showing the procedure of the integrated application formation processing.

To allow an element application named Editor to process an event called "do_something" for IntegWork, forwardMessage Editor "do_something"is described A mechanism for forming an integrated application which operates as described above will be described below with reference to FIGS. 19 and 20. FIG. 19 is a view for explaining the outline of integrated application formation processing. FIG. 20 is a flow chart showing the procedure of the integrated application formation processing. Parts denoted by reference numerals 2501 to 2510 in FIG. 19 correspond to the parts denoted by 2101 to 2110 in FIG. 15.

Also, a window 2511 in FIG. 19 provides a user 2512 with a user interface for forming an integrated application on a display 2506.

When the user designates the name of an integrated application to be formed in the window 2511, EventService 2510 receives this request and requests an application information management module 2507 to retrieve application information 2503 of the integrated application by using the designated application name as the key (step S2601). If the designated application information 2503 does not exist, new application information is generated (steps S2602 and S2603).

When the application information 2503 is obtained, a list of associated event names is fetched from the attribute eventNames which is a list of event names and displayed in the window 2510 (step S2604). If the application information is the one just formed in step S2603 described above, the list of event names to be displayed is empty. When the event name list is displayed, the processing from step S2605 to step S2616 is repeated until the user instructs termination of the processing.

The user 2512 can instruct addition and delete of an event to DesktopMgr 2502 via the window 2511. If the user does not instruct termination of the processing, the flow advances from step S2605 to step S2606.

Addition of an event is done as follows. When the event name of an event to be added is given (step S2606), this event name is added as an attribute value to the attribute eventNames in the application information 2503 (step S2607), and new script information 2505 is generated (step S2608). At this point of time the attribute eventName and the attribute owner in the script information are designated, but the value of the attribute scriptText is a NULL character string.

Delete of an event is executed when the user does not give any event name (step S2606), selects an event name to be deleted from the list displayed in the window 2511 (step S2609), and requests the DesktopMgr 2502 to delete the event (step S2610). Consequently, the script information 2505 corresponding to the selected event name is fetched and deleted (step S2611). Subsequently, the event name is deleted from the attribute eventNames in the application information 2503 (step S2612).

It is also possible to change processing corresponding to an event which is already registered. That is, if the user designates an event name in the window 2511 (step S2609) but does not issue a delete request (step S2610), the corresponding script information 2505 is fetched (step S2613) and displayed in the window 2511 (step S2614). In this embodiment only scripts registered in the attribute scriptText can be updated.

The user then edits the script displayed in the window 2511. If the script is updated (step S2615), the updated script is stored in the database as a new value of the attribute scriptText (step S2616). After the update or if no update is performed (step S2615), the flow returns to step S2605 to check whether the operation is to be continued or the processing is to be terminated. If there is no termination instruction from the user, the above processing is repeated.

The use of the above mechanism makes it possible to modify the event name list registered in the attribute eventNames in the application information 2503 and the script registered in the attribute scriptText in the script information 2505. Accordingly, it is possible to change the constitution of applications, the number of events, and the processing in a previously formed integrated application or to form a new integrated application.

As an example, to replace the application A 2311 with an application A' in the configuration shown in FIG. 17, it is only necessary to replace events registered in the application information corresponding to an integrated application 2314 and issued from the application A 2311 with events issued from the application A'.

When a script by which a message is sent from the integrated application 2314 to the application A 2311 by using the forwardMessage command is designated, the corresponding portion need only be so changed that the application A' can accept. Consequently, the application A' can be operated instead of the application A 2311.

Also, when a new application D is to be added to the configuration in FIG. 17, events issued from the application D are added to the application information corresponding to the integrated application 2314, and the scripts in the script information corresponding to the existing events are modified by taking account of the addition of the application D. Consequently, customizing can be performed without entirely rewriting the master.

In the third embodiment an integrated application provides an application linking mechanism in a single user environment. However, directly applying the integrated application management system described in this embodiment makes it possible to effectuate a cooperative work environment across a plurality of user environments by linking a plurality of applications which simultaneously operate in these user environments.

As described above, in the third embodiment an event to be processed by an integrated application can be defined. Also, by providing the extended TCL script language and thereby associating processing with an event by the script information, the processing for the event can be described as an element application linking operation.

Additionally, since the application information and the script information are introduced, it is possible to arbitrarily change the type of an event to be processed by an integrated application and the processing for the event.

Consequently, element applications are controlled by scripts described by a DesktopMgr, so each individual application need not take the constitution of an integrated application into consideration. It is also possible to absorb the difference between the external interfaces of the individual applications by using the event processing done by the integrated application.

Furthermore, an integrated application whose constitution dynamically changes can be realized. Accordingly, even when some alteration is necessary, only the application information and the script information need to be modified.

<Fourth Embodiment>

In the above third embodiment, the present invention is applied to an integrated application management system. In this fourth embodiment, a master application generating system which implements an integrated application analogous to that in the third embodiment will be described.

This master application generating system is a program which automatically generates the program of a master application for controlling an integrated application. Unlike in the third embodiment, the master application generating system itself does not directly control applications.

The master application formed by the fourth embodiment only has a function of controlling other applications. However, other functions can be added on the basis of the generated program.

Figure 21:
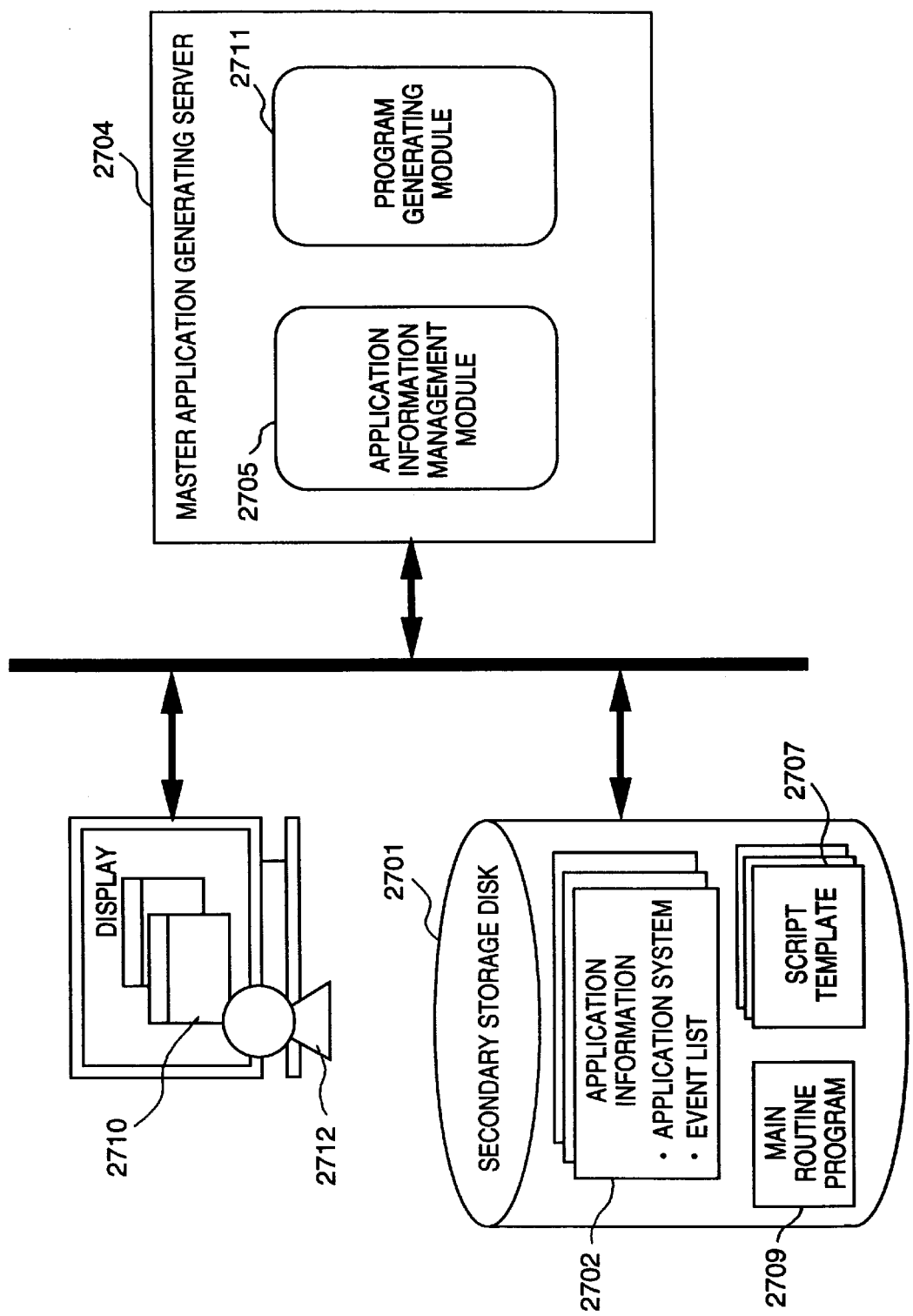
FIG. 21 is a schematic view showing a master application generating system in the second embodiment.

FIG. 21 is a schematic view of the master application generating system in the fourth embodiment. Referring to FIG. 21, a secondary storage disk 2701 stores application information 2702. This application information 2702 relates to the function of an application which a user 2712 requires to form a master application. The application information 2702 in the fourth embodiment is formed by removing dynamic information such as port numbers and process numbers from the application information 2103 in the third embodiment and, instead, adding a hash table to the information. The hash table manages additional information such as the contents of processing for an event and the change history of the event by using the event name as the key. This hash table will be called an event•script correspondence table hereinafter.

A master application generating server 2704 provides a user interface for managing application information and supporting generation of a master application by combining the application information, and forms a master program as the final outcome. The master application generating server 2704 consists of two software modules.

An application information management module 2705 in the fourth embodiment differs from the application information management module 2107 in the third embodiment which uses the function of the database 2104; that is, the application information management module 2705 manages the application information 2702 in the secondary storage disk 2701 by using the function of the hash table which uses the application name as the key. As described previously, the application information 2702 itself has a different structure from that of the application information 2103 in the third embodiment.

This application information management module 2705 also manages script template information 2707 by using a mechanism similar to that of the application information 2702. The script template information 2707 is a skeleton program describing a representative pattern of the skeleton of a script program. A user can form an actually executable script on the basis of the skeleton program.

A program generating module 2711 connects a main routine program 2709 and the application information 2702 on the basis of designation from the user, thereby forming a program of the master application. The main routine program 2709 is a simple program which receives an event from an application and executes the corresponding script.

A window 2710 provides a user interface. In this window 2710 the user designates applications to be integrated by the master and describes and registers scripts corresponding to events of these applications.

The application information in this embodiment is defined as follows:

```
class Applicationinfo {
    class EventInfo {
        char*eventName
        ApplicationInfo* owner;
        char* info;
        char* scriptText;
    };
    char* appName;
    ...
    ApplicationInfo* integrated_in;
    ListOf<ApplicationInfo> components;
    HashTable<char*, EventInfo> eventHandlers;
};
```

The additional information such as the contents of processing for an event and the change history of the event in the application information is managed by the event•script correspondence table eventHandlers and has substantially the same structure as the script information in the third embodiment. Since in the fourth embodiment improving the event processing little by little is important, the item "info" which describes the additional information such as the change history is added. In the fourth embodiment, the additional information such as the processing contents and the change history is called event information.

The principal difference between this fourth embodiment and the third embodiment is that in the third embodiment the relationship between the application information and the information pertaining to an event is a loose one using the event name, whereas this relationship is incorporated into the application information in the fourth embodiment.

Figure 22:
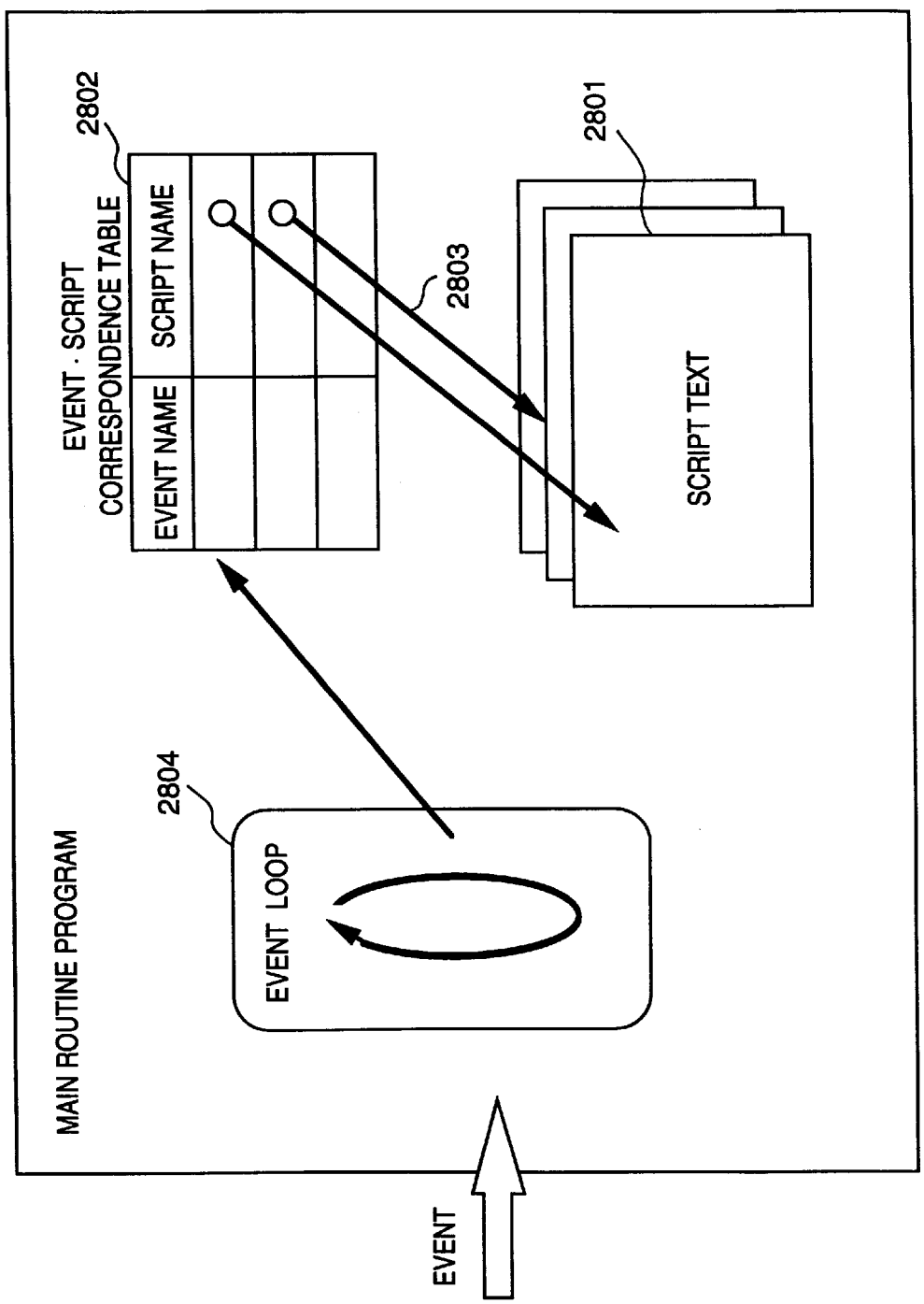
FIG. 22 is a view for explaining the outline of the operation of a main routine program.
Figure 23:
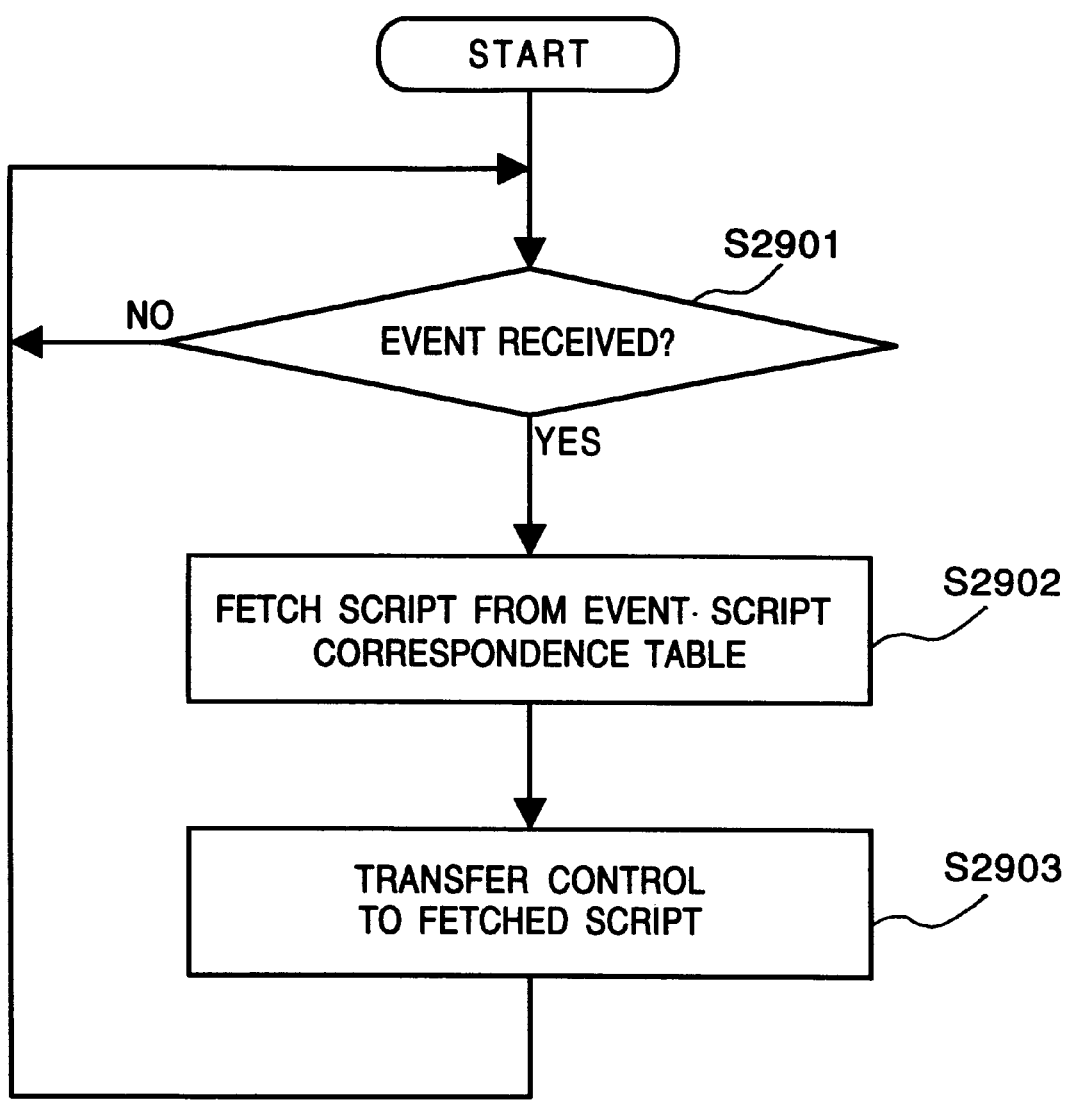
FIG. 23 is a flow chart showing the processing of the main routine program.

FIG. 22 is a view for explaining the outline of the operation of the main routine program. FIG. 23 is a flow chart showing the processing of the main routine program.

The main routine program is added with a script text 2801 fetched from an event•script correspondence table 2802 and the event•script correspondence table itself. The script text which is managed in the event•script correspondence table 2802 by the application information is separated when it is added to the main routine program, for the sake of convenience when the generated master program is changed later. As illustrated in FIG. 22, the correspondence of the event•script correspondence table 2802 and the script text 2801 is of course retained since the event•script correspondence table has a pointer 2803 to the script text 2801.

The correspondence table 2802 is referred to from the script in the fourth embodiment as a function named Event-Table by which the event name is fetched as an argument and the text of the script is returned. When an event loop 2804 receives an event (step S2901), the corresponding script text 2801 is fetched from the event•script correspondence table 2802 by using the event name added to the event as the key (step S2902), thereby transferring control to that script text (step S2903). The main routine program is a simple program which basically repeats this operation alone.

In the fourth embodiment, an extended version of the Lisp program language is used as a script language. However, the program generating module finally converts the Lisp script into a program in the C language (the Lisp program language is described in Guy L. Steel Jr. et al., translated by Masayuki Inoue, "Common LISP" (Kyoritsu Shuppan K. K.)).

This conversion mechanism utilizes a common program translation mechanism. In the fourth embodiment, extension of the Lisp script is done by addition of the following commands:

(1) (launchApp "application name")
(2) (terminateApp "application name")
(3) (forwardmessage "application name""text of message")

The functions of the commands (1), (2), and (3) are the same as the commands with the same names in the third embodiment, i.e., activation of an application, termination of an application, and transmission of a message, respectively.

In the fourth embodiment, necessary information can be incorporated into the master program, so no specific command is necessary to acquire the application information or the like. For this reason, only the commands for controlling applications described above are prepared. Since these functions are provided as the basic functions of an operating system, it is only necessary to utilize these functions from Lisp.

Figure 24:
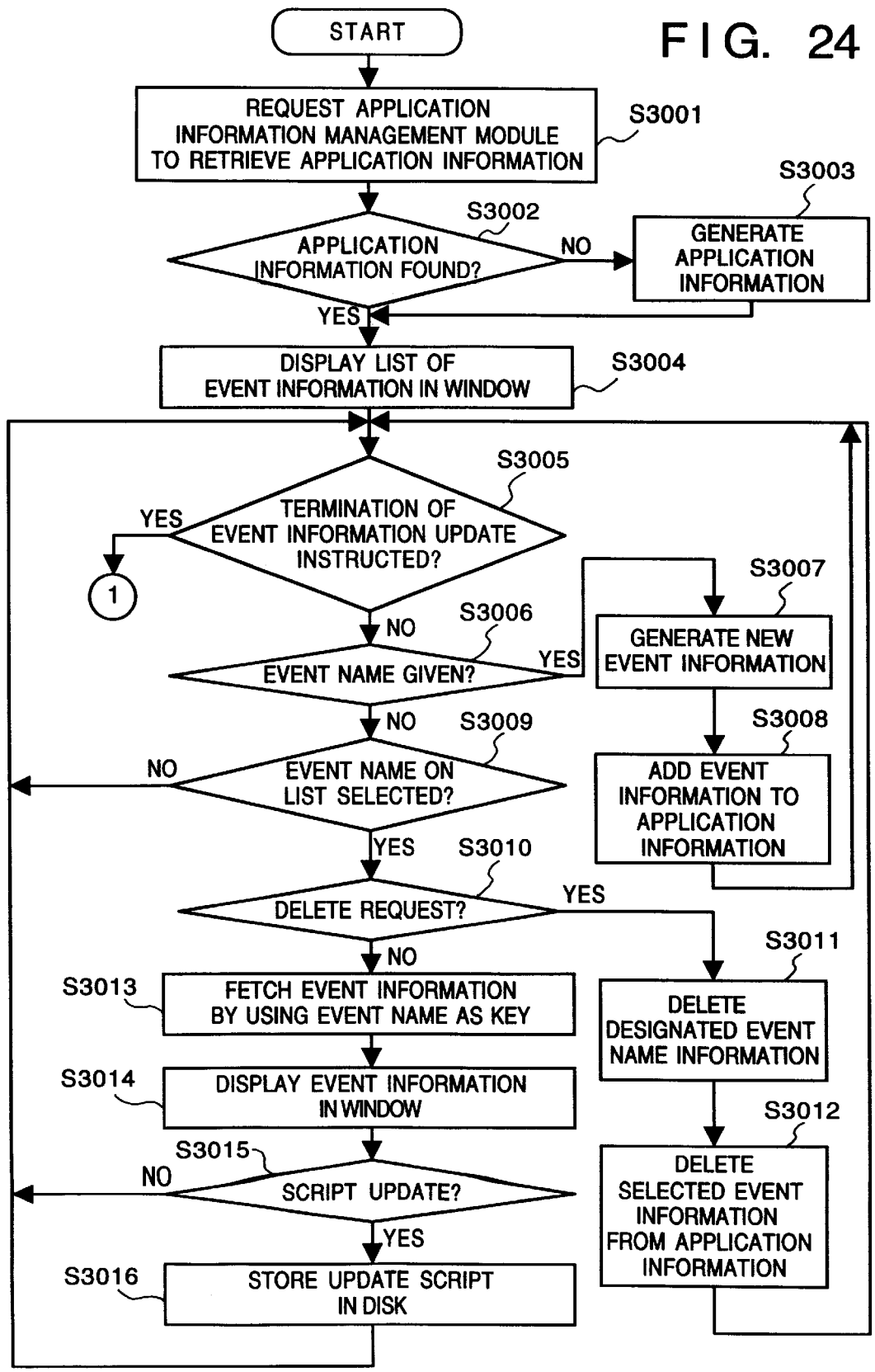
FIG. 24 is a flow chart showing the procedure of a program generating module.
Figure 25:
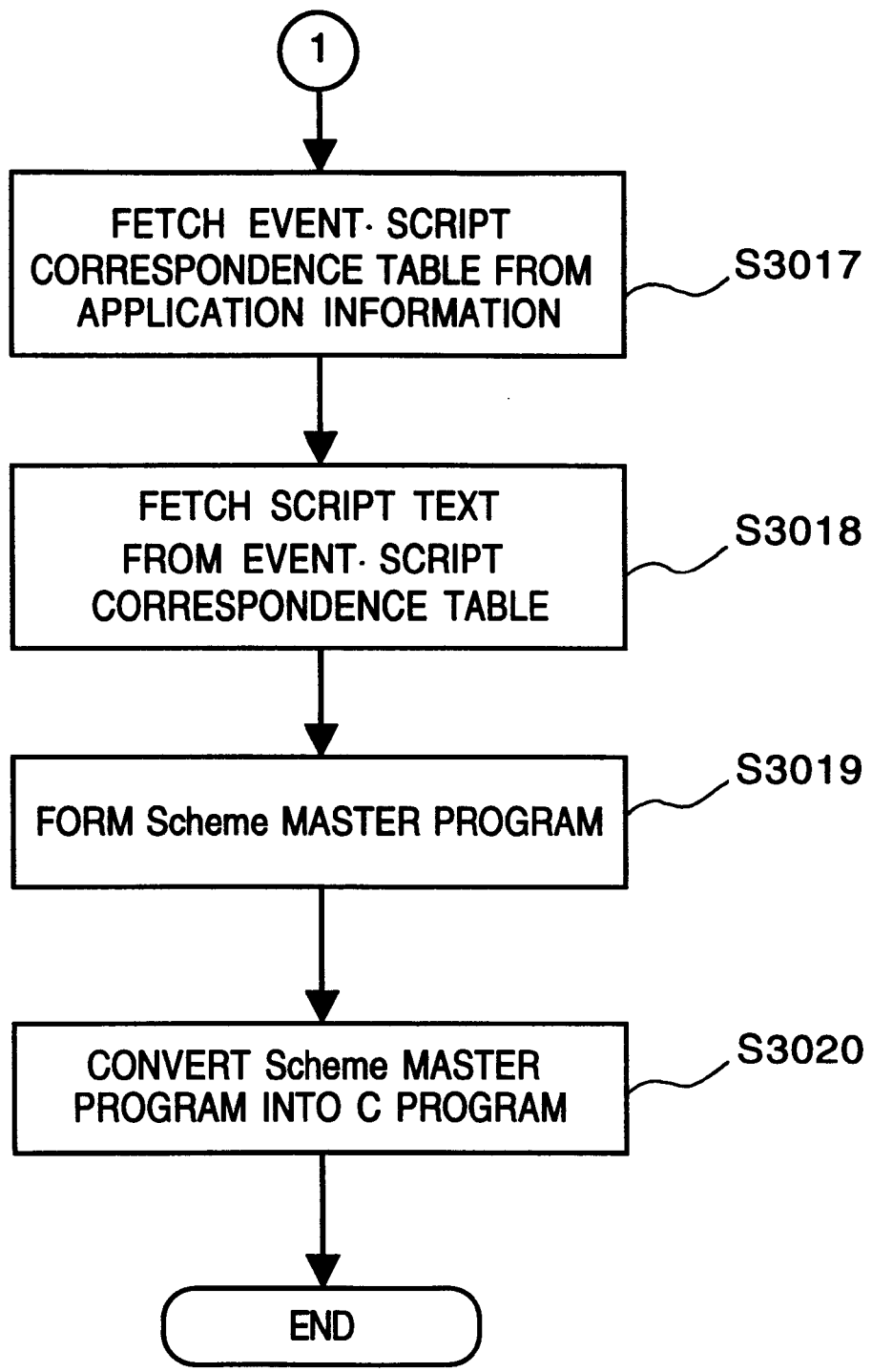
FIG. 25 is a flow chart showing the procedure of the program generating module.

The operation of the program generating module 2711 will be described below with reference to FIGS. 21, 24, and 25. FIGS. 24 and 25 are flow charts showing the procedures of the program generating module.

When the user designates the name of an integrated application to be formed in the window 2710, the application generating server 2704 requests the application management module 2705 to retrieve the application information 2702 by using the application name as the key (step S3001). If no application information exists (step S3002), new application information is generated (step S3003).

When the application information 2702 is obtained, the event•script correspondence table is fetched from eventHandlers of the application information 2702 and displayed in the window 2710 (step S3004). When the list of event names is displayed, the processing from step S3006 to step S3016 is repeated until the user instructs termination of the processing (step S3005).

In this fourth embodiment, addition, delete, and update of an event are possible as in the third embodiment.

That is, if the user does not instruct termination of the processing (step S3005), addition of an event is performed as follows. The event name of an event to be added is given (step S3006), event information is newly generated (step S3007) and added to the event•script correspondence table (step S3008). At this point of time the attribute eventName and the attribute owner are designated, but the values of the attribute scriptText and the attribute info are NULL character strings.

Delete of an event is executed when the event name is not given by the user (step S3006) but selected from the list in the window 2710 (step S3009) and the user requests the master application formation server 2704 to delete the event (step S3010). If this is the case the selected event information is deleted from the event•script correspondence table in step S3011, and the event information is deleted from the application information in step S3012.

Update of an event is done as follows. If the user designates the event in the window 2710 (step S3009) and does not request delete (step S3010), the corresponding event information is fetched from the event•script correspondence table (step S3013) and displayed in the window 2710 (step S3014). In the fourth embodiment, only the script registered in the attribute scriptText and the additional information registered in the attribute info can be updated. The user updates the event information by editing the script and the additional information in the window 2710 where necessary.

If the event information is updated in the window 2710 (step S3015), this update is written in application information 2703 in the secondary storage disk 2701 (step S3016). After the update is written in the disk 2701 or if no update is performed (step S3015), the flow returns to step S3005 to check whether the operation is to be continued or the processing is to be terminated. If there is no termination instruction from the user, the processing from step S3006 to step S3016 is continued.

If the user instructs termination of the event information check (step S3005), a program generating module 2711 fetches the event•script correspondence table from the application information (step S3017) and separates the script text from the event•script correspondence table (step S3018).

Subsequently, the program generating module 2711 merges the main routine program 2709 and the script text fetched from the event•script correspondence table and thereby forms a master program in the Lisp program language (step S3019). The final master program is generated by converting the Lisp master program thus formed into the C program language (step S3020).

In the fourth embodiment, when an integrated application needs to be changed, the above mechanism appropriately changes the application information on the basis of the application information before being changed. This makes it possible to generate a master program of a version corresponding to the change.

Also, as with the integrated application implemented in the third embodiment, the integrated application formed by the master program provided by the fourth embodiment can realize a cooperative work environment across a plurality of user environments by linking a plurality of applications which simultaneously operate in these user environments.

As described above, this fourth embodiment provides a means for defining a user operation, which is to be reflected between users, as an event, and introduces an event•script conversion table generating means by providing an extended Lisp program language, thereby providing a means for describing event processing as a linkage operation of applications operating in individual user environments.

Additionally, a means for changing the constitution of an event to be processed by an integrated application and changing the processing for that event is provided by providing a means for semiautomatically generating a master program from application information and script information.

In the fourth embodiment, even when the master program needs to be changed due to a change in the participants or the applications used in a joint work, the master program can be easily modified by updating the application information managed by a secondary storage disk.

Also, efficient processing can be realized because the generated master program can exclusively perform control for an application linkage as an object to be controlled.

As has been described above, the third and fourth embodiments can provide a flexible master application capable of meeting a complicated environment in which the components can dynamically change.

It is also possible to construct an application which operates in a complicated environment in which the components can dynamically change, without particularly taking account of the environment.

The objects of the present invention achieved by the function of the apparatus or method in any of the above embodiments can also be accomplished by a storage medium which stores the program of the embodiment. That is, this storage medium is mounted in the apparatus, and the program read out from the storage medium accomplishes the novel function of the present invention. The structural feature of the program of the present invention for this purpose will be described below.

Figure 26B:
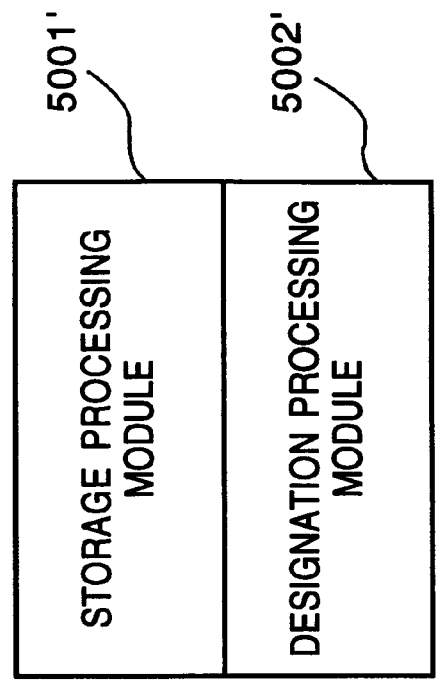
FIGS. 26A and 26B are views for explaining the arrangement of a storage medium which stores a control program for realizing the control in the first embodiment.
Figure 26A:
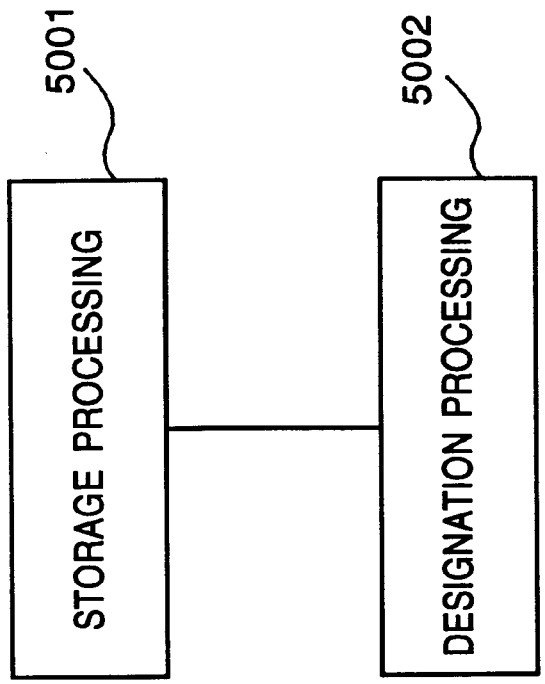

FIGS. 26A and 26B are views for explaining the arrangement of a storage medium storing a control program for implementing the control described in the first embodiment.

FIG. 26A shows the process procedure of the control program. In FIG. 26A, storage processing 5001 stores specific information for uniquely specifying each of a plurality of applications activated to execute linking processing. This processing is to position each tool (application) in the hierarchical structure, FIG. 5, in accordance with a tool path indicated by the activation request. This processing corresponds to the processing in step S806 (FIG. 8). Designation processing 5002 designates applications to be linked by using the specific information (tool path) stored by the storage processing 5001. This processing corresponds to the tool designation processing shown in FIG. 9.

FIG. 26B shows the memory map of the storage medium which stores the control program for realizing each processing in FIG. 26A. A storage processing module 5001' and a designation processing module 5002' are program modules for realizing the storage processing 5001 and the designation processing 5002, respectively.

Figure 27B:
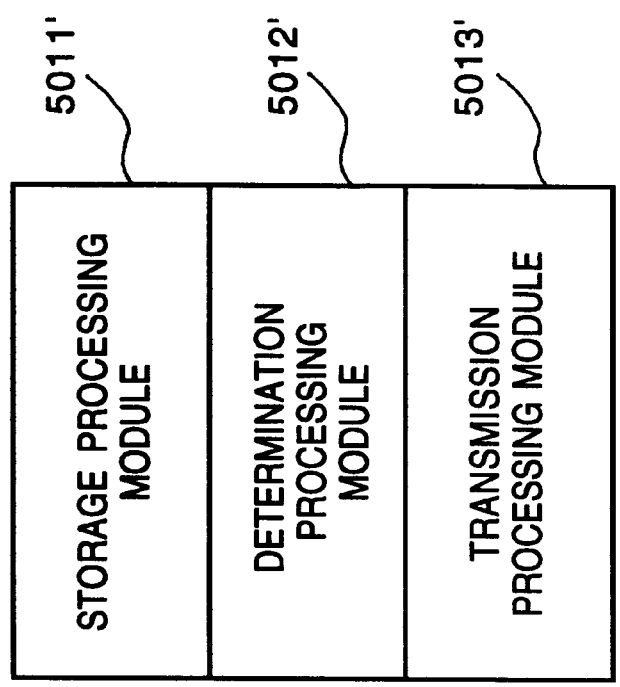
FIGS. 27A and 27B are views for explaining the arrangement of a storage medium which stores a control program for realizing the control in the second embodiment.
Figure 27A:
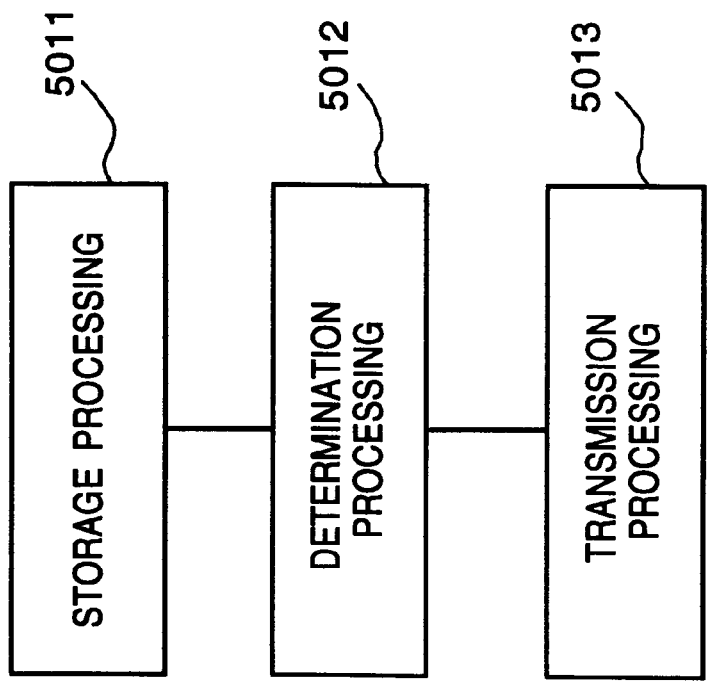

FIGS. 27A and 27B are views for explaining the arrangement of a storage medium which stores a control program for implementing the control described in the second embodiment.

FIG. 27A shows the process procedure of the control program. In FIG. 27A, storage processing 5011 stores shared data to be shared by a plurality of information processors and specific information for indicating an application by which the shared data is to be processed. This processing corresponds to the database 1306 shown in FIG. 13. Determination processing 5012 determines an application to be used on the basis of specific information corresponding to the shared data to be processed. This processing corresponds to step S1402 in FIG. 14. Transmission processing 5013 transmits the shared data to be processed to the application determined by the determination processing 5012. This processing corresponds to step S1405 in FIG. 14.

FIG. 27B shows the memory map of the storage medium which stores the control program for realizing each processing in FIG. 27A. A storage processing module 5011', a determination processing module 5012', and a transmission processing module 5013' are program modules for effectuating the storage processing 5011, the determination processing 5012, and the transmission processing 5013, respectively.

Figure 28B:
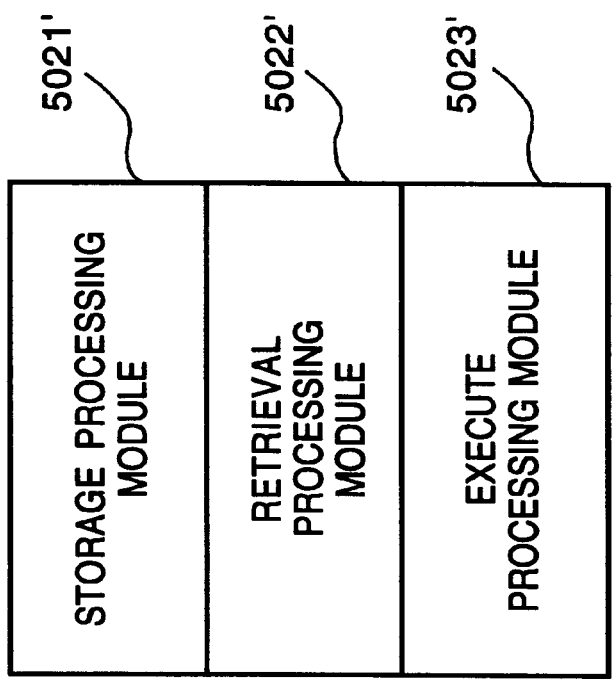
FIGS. 28A and 28B are views for explaining the arrangement of a storage medium which stores a control program for realizing the control in the third embodiment.
Figure 28A:
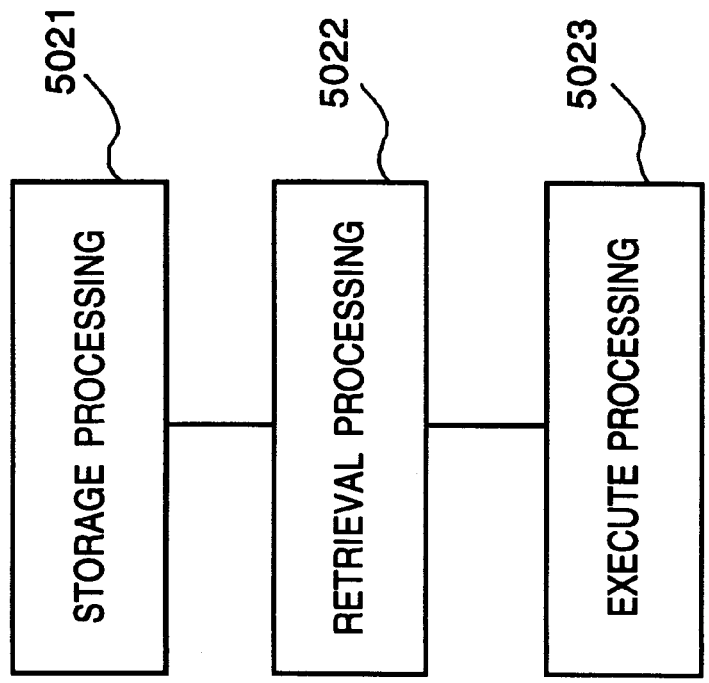

FIGS. 28A and 28B are views for explaining the arrangement of a storage medium storing a control program for realizing the control described in the third embodiment.

FIG. 28A illustrates the process procedure of the control program. In FIG. 28A, storage processing 5021 stores events issued in a linkage operating environment of a plurality of applications and event information indicative of the contents of processing of each event. This processing is to construct the database 2304 in FIG. 17. When an event is issued in this linkage operating environment, retrieval processing 5022 retrieves the processing contents corresponding to the event from the event information stored by the storage processing 5021. This processing corresponds to the processing from step S2401 to step S2403 in FIG. 18. Execute processing 5023 executes the processing on the basis of the event information retrieved by the retrieval processing 5022. This processing corresponds to step S2404 in FIG. 18.

FIG. 28B shows the memory map of the storage medium storing the control program for realizing each processing in FIG. 28A. A storage processing module 5021', a retrieval processing module 5022', and an execute processing module 5023' are program modules for implementing the storage processing 5021, the retrieval processing 5022, and the execute processing 5023, respectively.

Figure 29B:
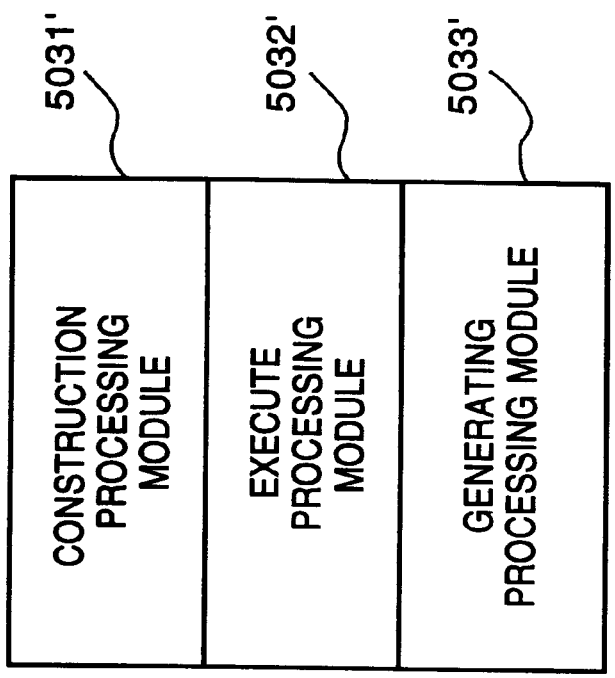
FIGS. 29A and 29B are views for explaining the arrangement of a storage medium which stores a control program for realizing the control in the fourth embodiment.
Figure 29A:
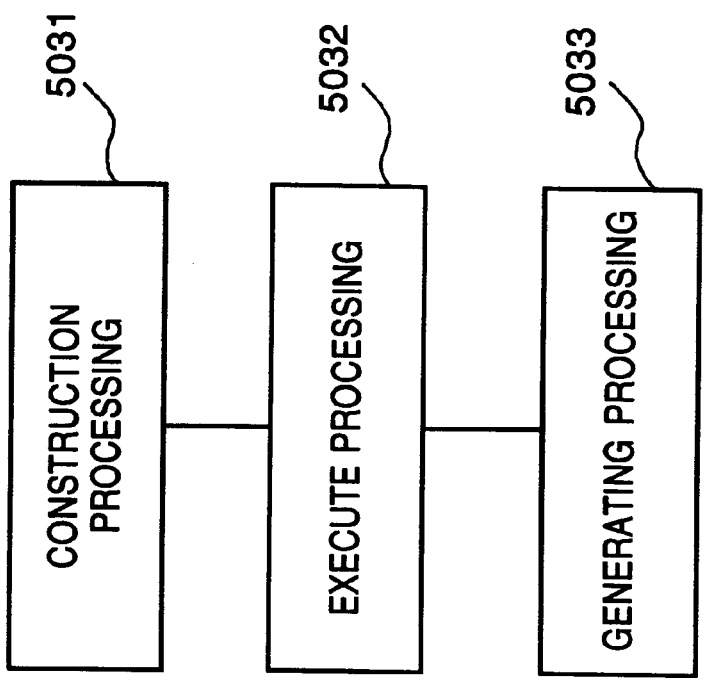

FIGS. 29A and 29B are views for explaining the arrangement of a storage medium which stores a control program for effectuating the control described in the fourth embodiment.

FIG. 29A illustrates the process procedure of the control program. In FIG. 29A, construction processing 5031 constructs events issued in a linkage operating environment of a plurality of applications and event information indicating the contents of processing of each event. This processing corresponds to the generating processing and the update processing of application information shown in FIG. 24. When an event is issued in this linkage operating environment, execute processing 5032 executes the procedure corresponding to the event. This processing corresponds to the main routine program in FIG. 22. Also, when an event is issued in the linkage operating environment, in order to acquire the procedure corresponding to the event on the basis of the event information, generating processing 5033 generates a control program by connecting the procedure of the execute processing and the event information. This processing is to generate the main routine shown in FIG. 22 and corresponds to step S3019 in FIG. 25.

FIG. 29B shows the memory map of the storage medium which stores the control program for realizing each processing in FIG. 29A. A storage processing module 5031', an execute processing module 5032', and a generating processing module 5033' are program modules for realizing the storage processing 5031, the execute processing 5032, and the generating processing 5033, respectively.

The present invention can be applied to a system constituted by a plurality of devices or to an apparatus comprising a single device. Furthermore, the invention is also applicable to a case where the invention is embodied by supplying a program to a system or apparatus. In this case, a storage medium storing a program according to the invention constitutes the invention. When the program is read out from the medium into a system or apparatus, the system or apparatus operates in a predetermined manner.

As many apparently widely different embodiments of the present invention can be made without departing from the spirit and scope thereof, it is to be understood that the invention is not limited to the specific embodiments thereof except as defined in the appended claims.

What is claimed is:

1. An information processing system for executing a plurality of applications by linking the applications in one or a plurality of information processors, comprising:

generating means for generating a path expression for uniquely specifying an application activated to execute linkage processing, the path expression representing a path from a predetermined root to the application in a hierarchical structure constructed on the basis of a work environment in which the linkage processing is performed, wherein the hierarchical structure has at least a hierarchical level for specifying linkage processing, a hierarchical level for specifying a user, and a hierarchical level for specifying an application; and designating means for designating an application to be linked by using the path expression generated by said generating means.

2. The system according to claim 1, wherein said generating means generates the path expression when the application in the work environment for performing the linkage processing is activated.

3. The system according to claim 1, wherein in the hierarchical structure the hierarchical level for specifying linkage processing serves as the predetermined root.

4. The system according to claim 1, further comprising transmitting means for transmitting a command to the application designated by said designating means.

5. The system according to claim 2, further comprising developing means for analyzing an abstract expression which abstractly expresses one or a plurality of elements in the hierarchical structure in accordance with a hierarchical level of the elements and developing the abstract expression into one or a plurality of path expressions, wherein said designating means designates an application to be linked by using the abstract expression.

6. An information processing system whose data is shared by a plurality of applications in one or a plurality of information processors, comprising:

storage means for storing shared data to be shared by said information processors with a path expression indicating an application by which the shared data is to be processed, the path expression representing a path from a predetermined root to the application in a hierarchical structure constructed on the basis of an operating environment of each information processor, wherein the hierarchical structure has at least a hierarchical level for specifying linkage processing, a hierarchical level for specifying a user, and a hierarchical level for specifying an application;

determining means for determining an application to be used on the basis of the path expression stored in said storage means with shared data to be processed; and transmitting means for transmitting the shared data to be processed to the application determined by said determining means.

7. The system according to claim 6, further comprising activating means for activating the application determined by said determining means if the application is not operating.

8. The system according to claim 6, wherein the shared data is data stored in a database, and the application is a viewer for displaying the data.

9. An information processing system for executing a plurality of applications by linking the applications in one or a plurality of information processors, comprising:

first storage means for storing application information, each application information including a name of an application, pointers to application information of component applications, and a name of an event related to the respective application;

second storage means for storing program information, each program information including a name of an event to be issued in a linkage operating environment of the applications, application information of an application which uses the program information, and a program to be performed for each event;

first retrieving means for retrieving, when an event is issued in the linkage operating environment, application information of an application which issued the event from said first storage means;

second retrieving means for retrieving program information corresponding to the event and the retrieved application information from said second storage means; and executing means for executing a program included in the process information retrieved by said second retrieving means.

10. The system according to claim 9, further comprising changing means for changing the name of an event included in the application information stored in said first storage means.

11. The system according to claim 9, further comprising changing means for changing a program included in the program information stored in said second storage means.

12. The system according to claim 9, wherein a program included in the program information stored in said second storage means is described in a script language.

13. The system according to claim 12, wherein said executing means interprets and executes the script language of the program information retrieved by said second retrieving means.

14. An information processing system for executing a plurality of applications by linking the applications in one or a plurality of information processors, comprising:

first storage means for storing application information, each application information including a name of an application and a correspondence table comprising a name of an event related to the application in correspondence with a process to be performed for the event;

second storage means for storing a processing program to be executed, when an event is issued in a linkage operating environment, for performing the process corresponding to the event; and generating means for generating, when a name of an application is designated in the linkage operating environment, a control program by merging the processing program with the correspondence table related to the application whose name was designated in order to acquire a master program for controlling the designated application.

15. The system according to claim 14, further comprising updating means for updating a name of an event in the correspondence table included in the application information stored in said first storage means.

16. The system according to claim 14, further comprising updating means for updating a process to be performed for an event in the correspondence table included in the application information stored in said first storage means.

17. The system according to claim 14, wherein said generating means separates the correspondence table into a list of event names and a description of the process for each event and merges the list and the description with the processing program.

18. The system according to claim 19, wherein the process in the correspondence table included in the application program and the processing program are described in a script language, and said generating means generates the master program in the script language by merging the correspondence table with the processing program.

19. The system according to claim 18, further comprising converting means for converting the master program into another language.

20. A method of controlling an information processing system for executing a plurality of applications by linking the applications in one or a plurality of information processors, comprising:

a generating step of generating a path expression for uniquely specifying an application activated to execute linkage processing, the path expression representing a path from a predetermined root to the application in a hierarchical structure constructed on the basis of a work environment in which the linkage processing is performed, wherein the hierarchical structure has at least a hierarchical level for specifying linkage processing, a hierarchical level for specifying a user, and a hierarchical level for specifying an application; and a designating step of designating an application to be linked by using the path expression generated by said generating step.

21. The method according to claim 20, wherein said generating step generates the path expression when the application in the work environment for performing the linkage processing is activated.

22. The method according to claim 20, further comprising a transmitting step of transmitting a command to the application designated by said designating step.

23. The method according to claim 20, wherein in the hierarchical structure the hierarchical level for specifying linkage processing serves as the predetermined root.

24. The method according to claim 21, further comprising a developing step of analyzing an abstract expression which abstractly expresses one or a plurality of elements in the hierarchical structure in accordance with a hierarchical level of the elements and developing the abstract expression into one or a plurality of path expressions, wherein said designating step designates an application to be linked by using the abstract expression.

25. A method of controlling an information processing system whose data is shared by a plurality of applications in one or a plurality of information processors, comprising:

a storage step of storing shared data to be shared by the information processors with a path expression indicating an application by which the shared data is to be processed, the path expression representing a path from a predetermined root to the application in a hierarchical structure constructed on the basis of an operating environment of each information processor, wherein the hierarchical structure has at least a hierarchical level for specifying linkage processing, a hierarchical level for specifying a user, and a hierarchical level for specifying an application;

a determining step of determining an application to be used on the basis of the path expression stored in said storage step with shared data to be processed; and a transmitting step of transmitting the shared data to be processed to the application determined by said determining step.

26. The method according to claim 25, further comprising an activating step of activating the application determined by said determining step if the application is not operating.

27. The method according to claim 25, wherein the shared data is data stored in a database, and the application is a viewer for displaying the data.

28. A method of controlling an information processing system for executing a plurality of applications by linking the applications in one or a plurality of information processors, comprising:

a first storage step of storing application information, each application information including a name of an application, pointers to application information of component applications, and a name of an event related to the respective application;

a second storage step of storing program information, each program information including a name of an event to be issued in a linkage operating environment of the applications, application information of an application which uses the program information, and a program to be performed for each event;

a first retrieving step of retrieving, when an event is issued in the linkage operating environment, application information of an application which issued the event from said first storage step;

a second retrieving step of retrieving program information corresponding to the event and the retrieved application information from said second storage step; and an executing step of executing a program included in the program information retrieved by said second retrieving step.

29. The method according to claim 28, further comprising a changing step of changing the name of an event included in the application information stored in said first storage step.

30. The method according to claim 28, further comprising a changing step of changing a program included in the program information stored in said second storage step.

31. The method according to claim 28, wherein a program included in the program information stored in said second storage step is described in a script language.

32. The method according to claim 31, wherein said executing step interprets and executes the script language of the program information retrieved by said second retrieving step.

33. A method of controlling an information processing system for executing a plurality of applications by linking the applications in one or a plurality of information processors, comprising:

a first storage step of storing application information, each application information including a name of an application and a correspondence table comprising a name of an event related to the application in correspondence with a process to be performed for the event;

a second storage step of storing a processing program to be executed, when an event is issued in a linkage operating environment, for performing the process corresponding to the event; and a generating step of generating, when a name of an application is designated in the linkage operating environment, a control program by merging the processing program with the correspondence table related to the application whose name was designated in order to acquire a master program for controlling the designated application.

34. The method according to claim 33, further comprising an updating-step of updating a name of an event in the correspondence table included in the application information stored in said first storage step.

35. The method according to claim 33, further comprising an updating step of updating a process to be performed for an event in the correspondence table included in the application information stored in said first storage step.

36. The method according to claim 33, wherein said generating step separates the correspondence table into a list of event names and a description of the process for each event and merges the list and the description with the processing program.

37. The method according to claim 33, wherein the process in the correspondence table included in the application program and the processing program are described in a script language, and said generating step generates the master program in the script language by merging the correspondence table with the processing program.

38. The method according to claim 33, further comprising a converting step of converting the master program into another language.

39. A computer readable medium storing a program executable by an apparatus to execute a method of controlling an information processing system for executing a plurality of applications by linking the applications in one or a plurality of information processors, the method comprising:

a generating step of generating a path expression for uniquely specifying an application activated to execute linkage processing, the path expression representing a path from a predetermined root to the application in a hierarchical structure constructed on the basis of a work environment in which the linkage processing is performed, wherein the hierarchical structure has at least a hierarchical level for specifying linkage processing, a hierarchical level for specifying a user, and a hierarchical level for specifying an application; and a designating step of designating an application to be linked by using the path expression generated by said generating step.

40. A computer readable medium storing a program executable by an apparatus to execute a method of controlling an information processing system whose data is shared by a plurality of applications in one or a plurality of information processors, the method comprising:

- a storage step of storing shared data to be shared by the information processors with a path expression indicating an application by which the shared data is to be processed, the path expression representing a path from a predetermined root to the application in a hierarchical structure constructed on the basis of an operating environment of each information processor, wherein the hierarchical structure has at least a hierarchical level for specifying linkage processing, a hierarchical level for specifying a user, and a hierarchical level for specifying an application;
- a determining step of determining an application to be used on the basis of the path expression stored in said storage step with shared data to be processed; and
- a transmitting step of transmitting the shared data to be processed to the application determined by said determining step.

41. A computer readable medium storing a program executable by an apparatus to execute a method of controlling an information processing system for executing a plurality of applications by linking the applications in one or a plurality of information processors, the method comprising:

- a first storage step of storing application information, each application information including a name of an application, pointers to application information of component applications, and a name of an event related to the respective application;
- a second storage step of storing program information, each program information including a name of an event to be issued in a linkage operating environment of the applications, application information of an application which uses the program information, and a program to be performed for each event;
- a first retrieving step of retrieving, when an event is issued in the linkage operating environment, application information of an application which issued the event from said first storage step;
- a second retrieving step of retrieving program information corresponding to the event and the retrieved application information from said second storage step; and
- an executing step of executing a program included in the program information retrieved by said second retrieving step.

42. A computer readable medium storing a program executable by an apparatus to execute a method of controlling an information processing system for executing a plurality of applications by linking the applications in one or a plurality of information processors, the method comprising:

- a first storage step of storing application information, each application information including a name of an application and a correspondence table comprising a name of an event related to the application in correspondence with a process to be performed for the event;
- a second storage step of storing a processing program to be executed, when an event is issued in a linkage operating environment, for performing the process corresponding to the event; and
- a generating step of generating, when a name of an application is designated in the linkage operating environment, a control program by merging the processing program with the correspondence table related to the application whose name was designated in order to acquire a master program for controlling the designated application.

* * * * *

UNITED STATES PATENT AND TRADEMARK OFFICE
CERTIFICATE OF CORRECTION

PATENT NO. : 6,021,444

DATED : February 1, 2000

INVENTOR(S) : TOSHIHIKO FUKASAWA

It is certified that error appears in the above-identified patent and that said Letters Patent is hereby corrected as shown below:

On the title page, Item
[56] REFERENCES CITED

Insert:  --U.S. PATENT DOCUMENTS

| | | | |
|---|---|---|---|
| 5,228,137 | 7/1993 | Kleinerman et al. | 395/500 |
| 5,475,843 | 12/1995 | Halviatti et al. | 395/704 |
| 5,592,664 | 1/1997 | Starkey | 395/601 |
| 5,627,958 | 5/1997 | Potts et al. | 395/336--. |

OTHER PUBLICATIONS

Insert: --Zondag, "Hierarchical management of distributed objects", University of Twente, Department of Computer Science, P.O. Box 217, 7500 AE Enschede, the Netherlands, pp. 1-22, 11/1990.--.

UNITED STATES PATENT AND TRADEMARK OFFICE
CERTIFICATE OF CORRECTION

PATENT NO. : 6,021,444

DATED : February 1, 2000

INVENTOR(S) : TOSHIHIKO FUKASAWA

It is certified that error appears in the above-identified patent and that said Letters Patent is hereby corrected as shown below:

COLUMN 7

Line 1, "tools" should read --tool--.
    Line 9, "name.." should read --name...--.
    Line 10, ".As" should read --As--; and
      Close up left margin.
    Line 23, "|user A, user B|" should read
      --[user A, user B]--.
    Line 50, "|%all, %none|" should read
      --[% all, % none]--.

COLUMN 9

Line 66, Close up left margin.
    Line 67, Close up left margin.

COLUMN 10

Line 1, Close up left margin.
    Line 2, Close up left margin.

UNITED STATES PATENT AND TRADEMARK OFFICE
CERTIFICATE OF CORRECTION

PATENT NO.   : 6,021,444

DATED        : February 1, 2000

INVENTOR(S)  : TOSHIHIKO FUKASAWA

It is certified that error appears in the above-identified patent and that said Letters Patent is hereby corrected as shown below:

COLUMN 10 CONTINUED

```
Line 3, Close up left margin.
Line 7, Close up left margin.
Line 8, Close up left margin.
Line 9, Close up left margin.
```

COLUMN 12

```
Line 66, Close up left margin.
Line 67, Close up left margin.
```

COLUMN 18

```
[Ex. 1], lines 20-40 should be replaced by:
    --set component_tools [AppInfo IntegWork info
      components];
      foreach tool $component_tools{
          launchApp $tool;
      }--.
```

UNITED STATES PATENT AND TRADEMARK OFFICE
CERTIFICATE OF CORRECTION

PATENT NO. : 6,021,444
DATED : February 1, 2000
INVENTOR(S) : TOSHIHIKO FUKASAWA It is certified that error appears in the above-identified patent and that said Letters Patent is hereby corrected as shown below:

COLUMN 18

Line 52, "This script" should read --¶ This script--.

COLUMN 28

Line 27, "claim 19," should read --claim 14,--.

Signed and Sealed this

Sixth Day of March, 2001

Attest:

NICHOLAS P. GODICI

Attesting Officer

Acting Director of the United States Patent and Trademark Office